United States Patent
Liu et al.

(10) Patent No.: US 12,314,832 B2
(45) Date of Patent: May 27, 2025

(54) CONTENT RECOMMENDATION METHOD AND APPARATUS, DEVICE, AND STORAGE MEDIUM

(71) Applicant: Tencent Technology (Shenzhen) Company Limited, Shenzhen (CN)

(72) Inventors: Yudan Liu, Shenzhen (CN); Kaikai Ge, Shenzhen (CN); Xu Zhang, Shenzhen (CN); Leyu Lin, Shenzhen (CN); Xin Chen, Shenzhen (CN); Xiaobo Hao, Shenzhen (CN); Wei Wang, Shenzhen (CN); Kai Zhuang, Shenzhen (CN); Su Yan, Shenzhen (CN); Zhida Pan, Shenzhen (CN); Linyao Tang, Shenzhen (CN); Jing Zhang, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 974 days.

(21) Appl. No.: 17/362,887

(22) Filed: Jun. 29, 2021

(65) Prior Publication Data
US 2021/0326674 A1 Oct. 21, 2021

Related U.S. Application Data

(63) Continuation of application No. PCT/CN2020/086946, filed on Apr. 26, 2020.

(30) Foreign Application Priority Data

May 13, 2019 (CN) .......................... 201910395560.4

(51) Int. Cl.
*G06N 3/04* (2023.01)
*G06N 3/084* (2023.01)

(52) U.S. Cl.
CPC ............... *G06N 3/04* (2013.01); *G06N 3/084* (2013.01)

(58) Field of Classification Search
CPC .......... G06N 3/04; G06N 3/084; G06N 3/045; G06Q 30/0282; G06Q 30/0631;
(Continued)

(56) References Cited

U.S. PATENT DOCUMENTS 11,068,474 B2 * 7/2021 Ni ............................. G06N 3/08
2018/0040035 A1 2/2018 Qi
(Continued)

FOREIGN PATENT DOCUMENTS

CN 105447730 A 3/2016
CN 106250464 A 12/2016
(Continued)

OTHER PUBLICATIONS

Ma et al, "Score Look-alike Audiences" (Year: 2016).*
(Continued)

*Primary Examiner* — Randall K. Baldwin
(74) *Attorney, Agent, or Firm* — Banner & Witcoff, Ltd.

(57) ABSTRACT

This application discloses a content recommendation method performed at a computer device and belongs to the field of artificial intelligence. The method includes: acquiring a target user vector of a target user; determining n groups of seed user vectors according to the target user vector, each group of seed user vectors corresponding to a respective piece of candidate recommendation content; invoking a look-alike model to calculate a similarity between the target user vector and each group of seed user vectors, the look-alike model being used for calculating a similarity between user vectors based on an attention mechanism; and determining, among the n pieces of candidate recommendation content, target content to be recommended to the target user (Continued)

according to the respective similarities of the corresponding n groups of seed user vectors. This application can resolve a problem of relatively low accuracy of a recommendation method in the related art.

20 Claims, 21 Drawing Sheets

(58) Field of Classification Search
CPC .............. G06F 16/9535; G06F 18/22; G06F 18/23213; G06F 18/24
See application file for complete search history.

(56) References Cited

U.S. PATENT DOCUMENTS

| | | | |
|---|---|---|---|
| 2019/0130257 A1 | 5/2019 | Meyerson et al. | |
| 2019/0139092 A1* | 5/2019 | Nomula | G06Q 30/0255 |

FOREIGN PATENT DOCUMENTS

| | | |
|---|---|---|
| CN | 108491529 A | 9/2018 |
| CN | 108921221 A | 11/2018 |
| CN | 109003143 A | 12/2018 |
| CN | 109389168 A | 2/2019 |
| CN | 109492157 A | 3/2019 |
| CN | 109740160 A | 5/2019 |
| CN | 110929206 A | 3/2020 |

OTHER PUBLICATIONS

Seo et al., "Interpretable Convolutional Neural Networks with Dual Local and Global Attention for Review Rating Prediction" (Year: 2017).*
Zhu et al., "Attentive Neural Network Recommendation for Ecommerce based on Various Implicit Feedback" (Year: 2018).*
Guan, Xinyu, et al. "Attentive aspect modeling for review-aware recommendation." ACM Transactions on Information Systems (TOIS) 37.3 (Mar. 2019): 1-27. (Year: 2019).*
Lin, Qika, et al. "Heterogeneous knowledge-based attentive neural networks for short-term music recommendations." IEEE Access 6 (2018): 58990-59000. (Year: 2018).*
Tencent Technology, WO, PCT/CN2020/086946, Aug. 7, 2020, 5 pgs.
Tencent Technology, IPRP, PCT/CN2020/086946, Nov. 16, 2021, 6 pgs.
Tencent Technology, ISR, PCT/CN2020/086946, Aug. 7, 2020, 3 pgs.

* cited by examiner

CONTENT RECOMMENDATION METHOD AND APPARATUS, DEVICE, AND STORAGE MEDIUM

CROSS-REFERENCE TO RELATED APPLICATIONS

This application is a continuation application of PCT Patent Application No. PCT/CN2020/086946, entitled "CONTENT RECOMMENDATION METHOD AND APPARATUS, AND DEVICE AND STORAGE MEDIUM" filed on Apr. 26, 2020, which claims priority to Chinese Patent Application No. 201910395560.4, filed with the State Intellectual Property Office of the People's Republic of China on May 13, 2019, and entitled "CONTENT RECOMMENDATION METHOD AND APPARATUS, TRAINING METHOD AND APPARATUS, DEVICE, AND STORAGE MEDIUM", all of which are incorporated herein by reference in their entirety.

FIELD OF THE TECHNOLOGY

This application relates to the field of Artificial Intelligence (AI), and in particular, to an information recommendation technology.

BACKGROUND OF THE DISCLOSURE

In a content recommendation system, a conventional recommendation algorithm performs content recommendation based on a historical behavior of a user and a semantic feature of content.

A recommendation method based on click-through rate estimation is used as an example. A deep network model is disposed in a server. For each pair of "user-content" combinations in a candidate content set, the deep network model predicts a click probability of a user on the content according to a historical click behavior of a user, a semantic feature of the content, and a context feature of the content. Then, for to-be-recommended content for a user, top n pieces of content ranked in descending order of click probabilities are recommended to the user as information streams.

In the related art, a recommendation algorithm usually selects push information only according to an interest of a target user, and determines a degree of interest of the user in the information by analyzing information content. However, this recommendation method ignores the user's needs for learning current hotspot events, reading high-quality content of a small audience, and the like, and often has a problem of relatively low accuracy.

SUMMARY

Embodiments of this application provide a content recommendation method and apparatus, a device, and a storage medium, which can improve accuracy of content recommendation. The technical solutions are as follows:

According to an aspect of this application, a content recommendation method is performed by a server and the method includes:

acquiring a target user vector of a target user;
determining n groups of seed user vectors according to the target user vector, each of the n groups of seed user vectors corresponding to a respective piece of candidate recommendation content, and n being a positive integer;
invoking a look-alike model to calculate a similarity between the target user vector and each group of seed user vectors, the look-alike model being used for calculating a similarity between user vectors based on an attention mechanism; and
determining, among the n pieces of candidate recommendation content, target content to be recommended to the target user according to the respective similarities of the corresponding n groups of seed user vectors.

According to another aspect of this application, a training method for a user vector extraction model is performed by a server. The user vector extraction model includes an embedding layer, a merging layer, and a full connection layer, the merging layer is a neural network layer based on a self-attention mechanism, and the method includes:

acquiring first training samples, the first training samples including user features of a plurality of sample users and interaction records of the plurality of sample users for sample content;
inputting a user feature of a first sample user into the user vector extraction model to obtain a first user vector, the first sample user being any one of the plurality of sample users in the first training samples;
calculating a dot product of the first user vector and an embedding vector of the sample content;
calculating a first error loss according to the dot product and an interaction record of the first sample user for the sample content; and
training the user vector extraction model according to the first error loss by using a back propagation algorithm.

According to another aspect of this application, a training method for a look-alike model is performed by a server. The look-alike model includes a first full connection layer, a second full connection layer, and an attention unit, and the method includes:

acquiring second training samples, the second training samples including a sample user vector and seed user vectors corresponding to sample content;
invoking the first full connection layer to perform feature extraction on the seed user vectors to obtain seed look-alike vectors; and invoking the second full connection layer to perform feature extraction on the sample user vector to obtain a sample look-alike vector;
invoking the attention unit to calculate a seed weight vector according to the seed look-alike vectors and the sample look-alike vector;
calculating a vector distance between the seed weight vector and the sample look-alike vector; and
calculating a second error loss according to the vector distance, and training the look-alike model according to the second error loss by using a back propagation algorithm.

According to another aspect of this application, a content recommendation apparatus is provided. The apparatus includes:

an acquiring module, configured to acquire a target user vector of a target user;
a candidate content determining module, configured to determine n groups of seed user vectors according to the target user vector, each of the n groups of seed user vectors corresponding to a respective piece of candidate recommendation content, and n being a positive integer;
a calculation module, configured to invoke a look-alike model to calculate a similarity between the target user vector and each group of seed user vectors, the look-alike model being used for calculating a similarity between user vectors based on an attention mechanism; and a target content determining module, configured to determine, among the n pieces of candidate recommendation content, target content to be recommended to the target user according to the respective similarities of the corresponding n groups of seed user vectors.

According to another aspect of this application, a training apparatus for a user vector extraction model is provided. The apparatus includes:

an acquiring module, configured to acquire first training samples, the first training samples including user features of a plurality of sample users and interaction records of the plurality of sample users for sample content;

an input module, configured to input a user feature of a first sample user into the user vector extraction model to obtain a first user vector, the first sample user being any one of the plurality of sample users in the first training samples;

a calculation module, configured to calculate a dot product of the first user vector and an embedding vector of the sample content, the calculation module being further configured to calculate a first error loss according to the dot product and an interaction record of the first sample user for the sample content; and the calculation module being further configured to train the user vector extraction model according to the first error loss by using a back propagation algorithm.

According to another aspect of this application, a training apparatus for a look-alike model is provided. The apparatus includes:

an acquiring module, configured to acquire second training samples, the second training samples including sample user vector and seed user vectors corresponding to sample content;

an invoking module, configured to invoke a first full connection layer to perform feature extraction on the seed user vectors to obtain seed look-alike vectors; and invoke a second full connection layer to perform feature extraction on the sample user vector to obtain a sample look-alike vector, the invoking module being further configured to invoke an attention unit to calculate a seed weight vector according to the seed look-alike vectors and the sample look-alike vector;

a calculation module, configured to calculate a vector distance between the seed weight vector and the sample look-alike vector; and a training module, configured to calculate a second error loss according to the vector distance, and train the look-alike model according to the second error loss by using a back propagation algorithm.

According to another aspect of this application, a computer device is provided. The computer device includes:

a processor and a memory, the memory storing a plurality of computer programs, the computer programs, when executed by the processor, causing the computer device to implement the content recommendation method, the training method for a user vector extraction model, or the training method for a look-alike model.

According to another aspect of this application, a non-transitory computer-readable storage medium is provided. The computer readable storage medium stores a plurality of computer programs that, when executed by a processor of a computer device, cause the computer device to implement the content recommendation method, the training method for a user vector extraction model, or the training method for a look-alike model.

According to another aspect of this application, a computer program product is provided, including instructions, the computer program product, when running on a computer, causing the computer to perform the content recommendation method, the training method for a user vector extraction model, or the training method for a look-alike model.

The technical solutions provided in the embodiments of this application achieve at least the following beneficial effects:

n groups of seed user vectors are used for representing interest features of n pieces of candidate recommendation content, and an attention mechanism is introduced into a look-alike model. The attention mechanism is used for calculating similarities between a target user vector and a plurality of seed user vectors corresponding to the candidate recommendation content, so as to determine a degree of interest of a target user in the candidate recommendation content. The attention mechanism enables the same group of seed user vectors to provide different weights when performing interest prediction on different target users, thereby improving an expression capability of the seed user vector, and effectively improving accuracy and reliability of the look-alike model during prediction.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1:
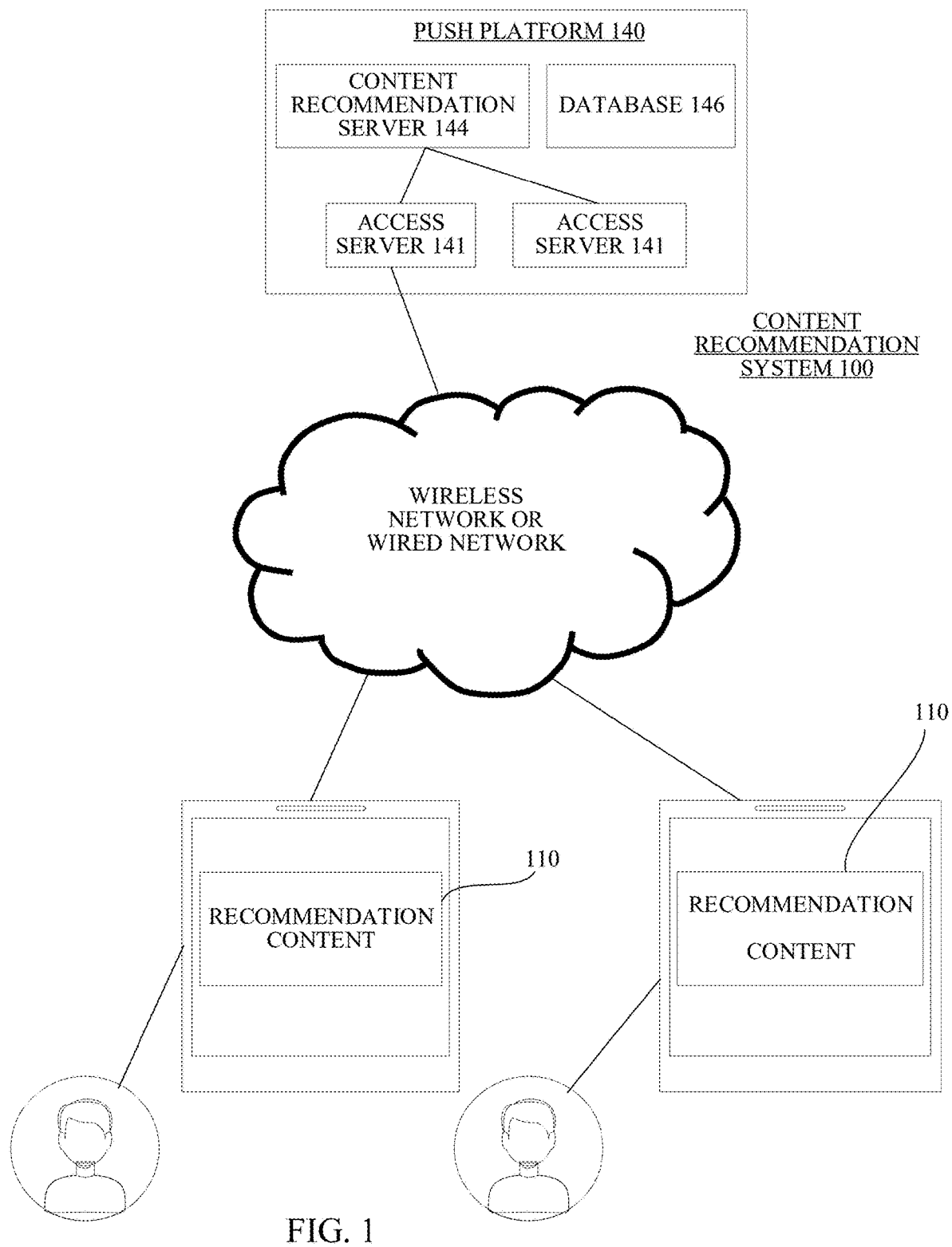
FIG. 1 is a structural block diagram of a content recommendation system according to an exemplary embodiment of this application.

To make the objectives, technical solutions, and advantages of this application clearer, the following further describes implementations of this application in detail with reference to the accompanying drawings.

First, several terms used in the embodiments of this application are briefly introduced.

Neural network model: It is a complex network system formed by extensive interconnection of a plurality of processing units (referred to as neurons). The neural network model is used for simulating and reflecting many basic features of human brain functions and is a highly complex nonlinear dynamic learning system.

Look-alike model: It is a neural network model in which content is recommended to a target user based on a similarity between a seed user and the target user. The seed user may be a user or a group of users. For example, three million users who have clicked on web page A may be considered as a seed user group of web page A.

Attention mechanism: It is a means of quickly selecting high-value information from a large amount of information by using limited attention resources. The attention mechanism is widely used in various types of deep learning tasks such as natural language processing, image recognition, and speech recognition, and is one of the core technologies in the deep learning technology that deserves attention and in-depth understanding.

Target user vector: It is a vector used for representing an interest of a target user.

Seed user vector: It is a vector used for representing an interest of a seed user.

Seed user group corresponding to candidate recommendation content: It includes a user who has generated an interaction behavior with the candidate recommendation content. The user who has generated an interaction behavior includes, but is not limited to: at least one of a user who has clicked on the candidate recommendation content, a user who has shared the candidate recommendation content, a user whose reading duration exceeds a threshold, and a user who has commented or liked the candidate recommendation content.

Content: It is an information set formed by at least one of text, a picture, an expression, an audio, and a video. For example, the content may be a web page, a TV play, or music.

In a look-alike model, content recommendation is performed by calculating a similarity between a target user and a seed user. Usually, there are many seed users, such as dozens of, hundreds of, or thousands of seed users. Among these seed users, there may be some seed users that are very similar to the target user, while some other seed users have a low similarity with the target user. Generally, each seed user is treated equally. Therefore, a seed user having a relatively low similarity introduces relatively large noise, causing the precision of the look-alike model to decrease.

In the embodiments of this application, the attention mechanism is introduced into the look-alike model, and the attention mechanism is used for calculating a similarity between a target user vector and a seed user vector corresponding to candidate recommendation content. For different target users, the attention mechanism can select, from a plurality of seed user vectors, vector information that has a more reference value for content recommendation to a current target user, so as to improve accuracy of recommending content to the target user.

FIG. 1 is a structural block diagram of a content recommendation system 100 according to an exemplary embodiment of this application. The content recommendation system 100 includes a terminal 110 and a push platform 140.

The terminal 110 is connected to the push platform 140 by using a wireless network or a wired network.

The terminal 110 may be at least one of a smartphone, a game console, a desktop computer, a tablet computer, an ebook reader, a moving picture experts group audio layer III (MP3) player, a moving picture experts group audio layer IV (MP4) player, and a portable laptop computer.

An application supporting content recommendation is installed and run on the terminal 110.

The application may be any one of a voice social application, an instant messaging application, a team voice application, a social application aggregating people based on topics, channels, or circles, a social application based on shopping, a browser application, and a video application.

Schematically, the terminal 110 is a terminal used by a first user, and a first user account logs in to an application run on the terminal 110.

The terminal 110 is connected to the push platform 140 by using a wireless network or a wired network.

The push platform 140 includes at least one of one server, a plurality of servers, a cloud computing platform, and a virtualization center.

The push platform 140 is configured to provide a backend service for the application supporting the content recommendation.

In some embodiments, the push platform 140 takes on primary computing work, and the terminal 110 takes on secondary computing work. Alternatively, the push platform 140 takes on secondary computing work, and the terminal 110 takes on primary computing work. Alternatively, collaborative computing is performed by using a distributed computing architecture between the push platform 140 and the terminal 110.

In some embodiments, the push platform 140 may include: an access server 141, a content recommendation server 144, and a database 146. The access server 141 is configured to provide an access service for the terminal 110. The content recommendation server 144 is configured to provide a backend service related to content recommendation. There may be one or more content recommendation servers 144.

When there are a plurality of content recommendation servers 144, at least two content recommendation servers 144 are configured to provide different services, and/or at least two content recommendation servers 144 are configured to provide the same service, for example, provide the same service in a load balancing manner. This is not limited in the embodiments of this application. A look-alike model is disposed in the content recommendation server 144. In the embodiments of this application, a look-alike model based on a real-time attention mechanism is referred to as a real-time attention based look-alike model (RALM).

A person skilled in the art may learn that in the content recommendation system 110 shown in FIG. 1, there may be more or fewer terminals 110. For example, there may be only one terminal, or there may be dozens of or hundreds of or more terminals. In this case, the content recommendation system further includes another terminal 110.

The quantity and the device type of the terminals 110 are not limited in the embodiments of this application.

Figure 2:
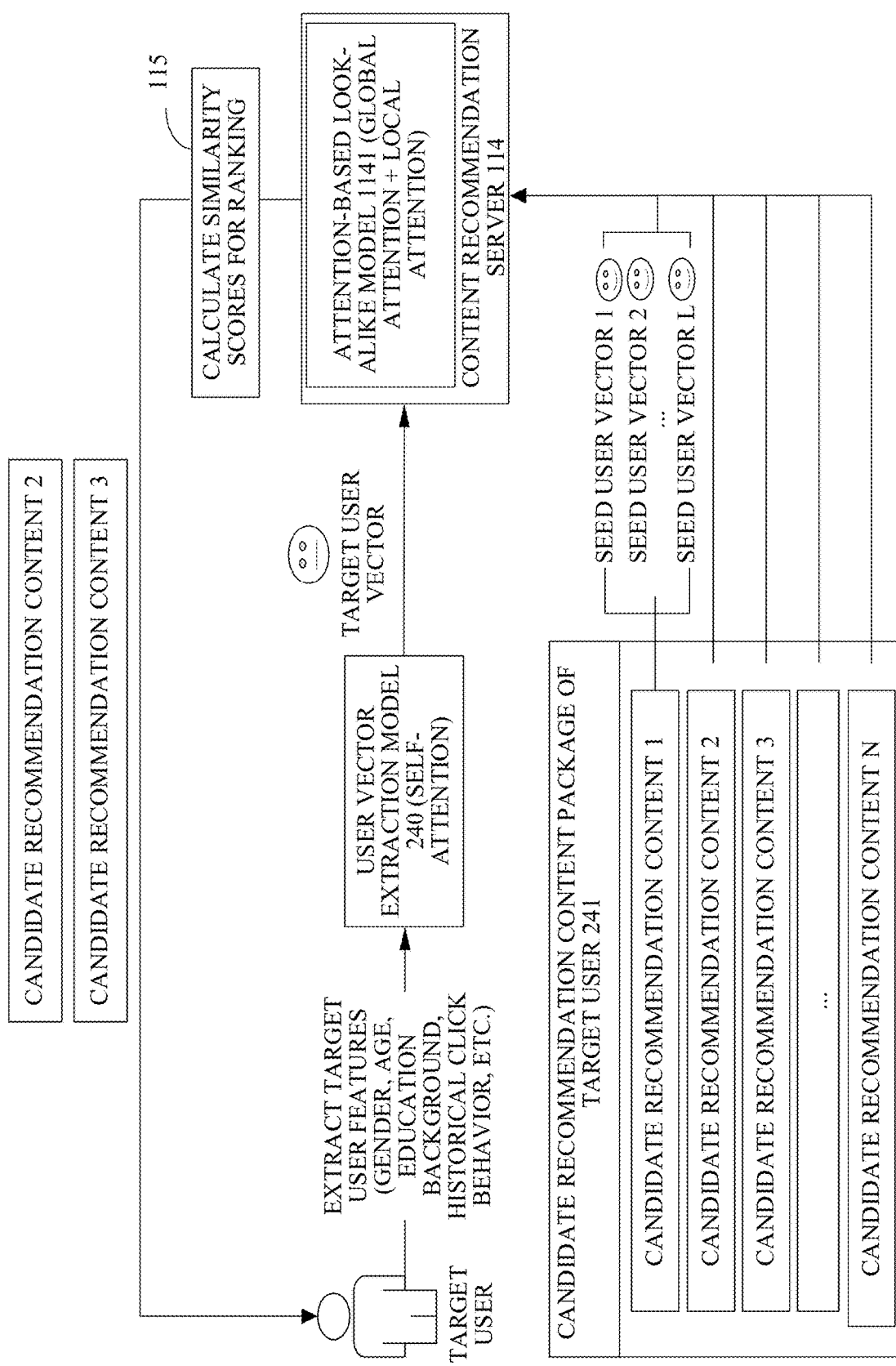
FIG. 2 is a schematic diagram of a content recommendation method according to an exemplary embodiment of this application.

FIG. 2 is a schematic diagram of a content recommendation method according to an exemplary embodiment of this application. An attention-based look-alike model 1141 is run on a content recommendation server 114.

The content recommendation server 114 extracts a user feature of a target user, and inputs the user feature of the target user into a user vector extraction model 240 that is used for extracting a user vector. The user vector extraction model 240 is a neural network model based on an attention mechanism. The neural network model includes a self-attention-based merging layer. After user features are input into the user vector extraction model 240 in a vector form, weights of the user features are calculated by using the merging layer and then weighted fusion is performed on the weights, to output a user vector that can represent the user's interest. Compared with a connection layer widely used in a conventional neural network model, performance of the merging layer is significantly better than that of the conventional connection layer, overfitting and noise problems caused by a strong correlation feature and a weak correlation feature can be solved, and in particular, performance of a multi-domain feature is significantly superior.

Each target user corresponds to a candidate recommendation content package 241 (or a candidate recommendation content pool). The candidate recommendation content package 241 includes a plurality of pieces of candidate recommendation content, for example, candidate recommendation content 1, candidate recommendation content 2, candidate recommendation content 3, . . . , and candidate recommendation content N. Each piece of candidate recommendation content corresponds to a group of seed users that have interacted with the candidate recommendation content. Each seed user is represented in a vector manner. Correspondingly, a group of seed user vectors corresponding to a piece of candidate recommendation content may represent a feature of the candidate recommendation content in a dimension of interest.

The content recommendation server 114 inputs a target user vector and a group of seed user vectors used for representing a piece of candidate recommendation content into the attention-based look-alike model 1141. The look-alike model 1141 can select a vector that has a more reference value for the target user from a group of seed user vectors based on the attention mechanism, to perform similarity calculation.

In some embodiments, an attention unit in the look-alike model 1141 includes a global attention unit and a local attention unit. The global attention unit is configured to capture composition of a plurality of seed user vectors, weight a representative individual (that is, a seed user vector similar to the target user vector), and punish a noise-involved individual (that is, a seed user vector not similar to the target user vector), which can achieve better effects than equally processing each seed user vector. The local attention unit is configured to capture some seed user vectors most similar to the target user vector, and weight a related individual to the target user, so that representations of each group of seed user vectors change between different target users, thereby greatly improving a representation capability of the seed user vector.

The content recommendation server 114 calculates a similarity score 115 between a seed user vector of each piece of candidate recommendation content and the target user vector, where the similarity is used for indicating a degree of interest of the target user in the candidate recommendation content. Each piece of candidate recommendation content is ranked by similarity score, and the top ranked candidate recommendation content is recommended to the target user.

Figure 3:
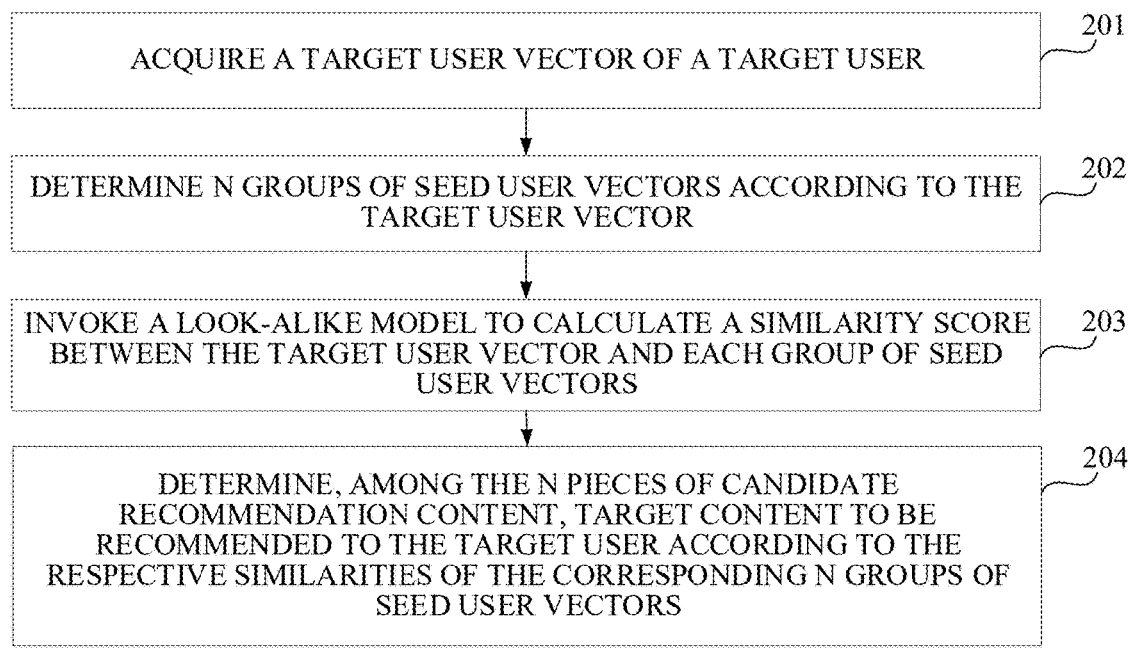
FIG. 3 is a flowchart of a content recommendation method according to an exemplary embodiment of this application.

FIG. 3 is a flowchart of a content recommendation method according to an exemplary embodiment of this application. The method may be performed by the content recommendation server 144 shown in FIG. 1. The method includes the following steps:

Step 201: Acquire a target user vector of a target user.

The target user is a user account to which recommendation content is to be pushed. The target user vector is a vector used for representing an interest of the target user. The content recommendation server 144 may determine, according to the target user vector, a candidate recommendation content package to be recommended to the target user. The candidate recommendation content package includes n pieces of candidate recommendation content, and n is an integer greater than 1.

In some embodiments, the target user vector is acquired according to a feature of the user in at least one domain, and the domain is a logical range divided according to a feature attribute. For example, the domain includes at least one of gender, age, and education background.

Step 202: Determine n groups of seed user vectors according to the target user vector.

The n group of seed user vectors correspond to n pieces of candidate recommendation content. In other words, each of the n groups of seed user vectors corresponds to a respective piece of the n pieces of candidate recommendation content, n being a positive integer. An $i^{th}$ group of seed user vectors in the n groups of seed user vectors is used for representing an interest feature of an $i^{th}$ piece of candidate recommendation content.

For the $i^{th}$ candidate recommendation content, each seed user corresponding to the $i^{th}$ group of seed user vectors is a user who has generated an interaction behavior with the $i^{th}$ candidate recommendation content within a historical time period.

In an example, the content recommendation server 144 acquires a user feature of a user who has historically clicked on each piece of candidate recommendation content, and a user who has clicked on the candidate recommendation content is considered as a seed user of the candidate recommendation content. There may be L seed users in a group, and a seed user vector of each seed user is calculated according to a user feature of the seed user. The L seed user vectors are used for representing an interest feature of the candidate recommendation content. L is a positive integer.

Step 203: Invoke a look-alike model to calculate a similarity between the target user vector and each group of seed user vectors.

The look-alike model is used for calculating the similarity based on an attention mechanism. The look-alike model can select a seed user vector that has a more reference value for the target user from a group of seed user vectors based on the attention mechanism, to perform similarity calculation.

The content recommendation server 144 calculates the similarity between the target user vector and each group of seed user vectors by using the look-alike model. Because each group of seed user vectors corresponds to one piece of candidate recommendation content, a degree of interest of the target user in each piece of candidate recommendation content may be evaluated by using a similarity of a group of seed user vectors corresponding to the candidate recommendation content. For example, a higher similarity indicates that the target user is more interested in the candidate recommendation content.

The attention mechanism is used for assigning different weights to a plurality of seed user vectors in a group. For example, a higher weight is assigned to a seed user vector having a higher similarity with the target user vector, and a lower weight is assigned to a seed user vector having a lower similarity, so as to minimize noise impact of a seed user vector having a lower similarity on a calculation result.

In some embodiments, the attention mechanism includes at least one of a self-attention mechanism, a global attention mechanism, and a local attention mechanism.

Step 204: Determine, among the n pieces of candidate recommendation content, target content to be recommended to the target user according to the respective similarities of the corresponding n groups of seed user vectors.

In some embodiments, the n pieces of candidate recommendation content may be ranked by similarity, and the top m ranked pieces of candidate recommendation content are determined as target content to be recommended to the target user, where both n and m are positive integers, and m is less than or equal to n. In some embodiments, candidate recommendation content whose similarity is higher than a preset threshold may also be determined as target content to be recommended to the target user. This application sets no limitation on a manner of determining the target content based on the similarity.

In this embodiment, the first several pieces of candidate recommendation content with high similarities are used as target content to be recommended to the target user. In another possible implementation, the candidate recommendation content may be alternatively ranked by difference score, where the difference score is used for indicating a degree of disinterest of the target user in the candidate recommendation content, and a recommendation policy is determined according to candidate recommendation content that the target user is not interested in.

In conclusion, in this embodiment, the attention mechanism is introduced into the look-alike model. The attention mechanism is used for calculating the similarities between the target user vector and a plurality of seed user vectors corresponding to candidate recommendation content, determine a degree of interest of the target user in the candidate recommendation content according to the similarities, predict a probability that the target user is interested in one piece of candidate recommendation content by comparing similarities of interest between the target user and a plurality of seed users, and use a group of seed user vectors to represent an interest feature of one piece of candidate recommendation content, thereby effectively improving accuracy and reliability of content prediction.

Figure 4:
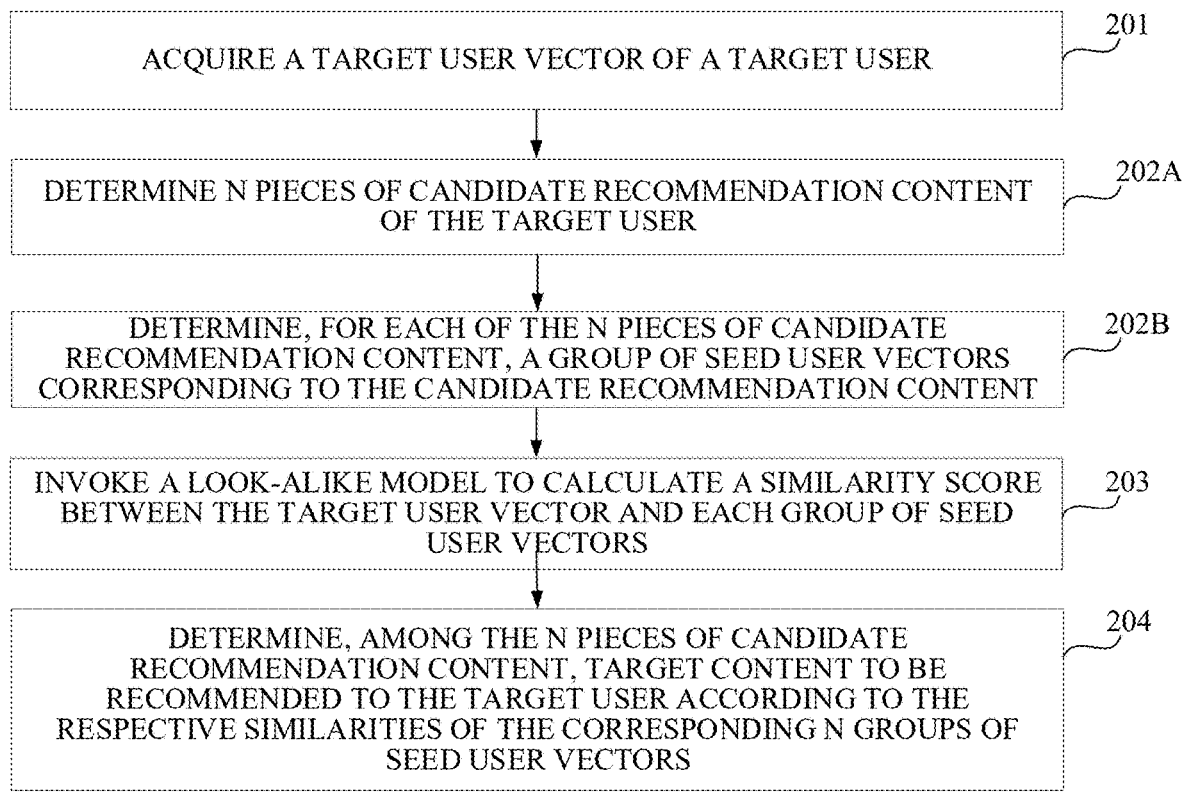
FIG. 4 is a flowchart of a content recommendation method according to another exemplary embodiment of this application.

Based on the content in the foregoing embodiment, FIG. 4 shows a flowchart of a content recommendation method according to another exemplary embodiment. Step 202 includes the following step 202*a* and step 202*b*:

Step 202*a*: Determine n pieces of candidate recommendation content of the target user.

The content recommendation server 144 may initially select, in a preset manner, a candidate recommendation content package corresponding to a single target user, because there may be a large amount of (for example, hundreds of millions pieces of) content available for recommendation in a content recommendation system.

The preset manner includes, but is not limited to: selecting by using another neural network model, selecting based on content viewed by a friend user of the target user, and selecting based on content that needs to be recently released. A manner of determining the n pieces of candidate recommendation content corresponding to the target user is not limited in this embodiment of this application.

Step 202*b*: Determine, for each of then pieces of candidate recommendation content, a group of seed user vectors corresponding to the candidate recommendation content.

For each of the n pieces of candidate recommendation content, user vectors of L users who have generated an interaction behavior with the candidate recommendation content within a preset time period are used as a group of seed user vectors corresponding to the candidate recommendation content, and each group of seed user vectors includes the user vectors of the L users.

For example, the content recommendation system determines a piece of candidate recommendation content, and uses user vectors of three million users who have clicked on (or read, shared, commented, liked, or appreciated by using a virtual resource or a physical resource) the candidate recommendation content within a preset time period (for example, last week or last month) as seed user vectors. Certainly, a user who interacted with the candidate recommendation content in another form may also be used as a seed user of the candidate recommendation content.

Figure 5:
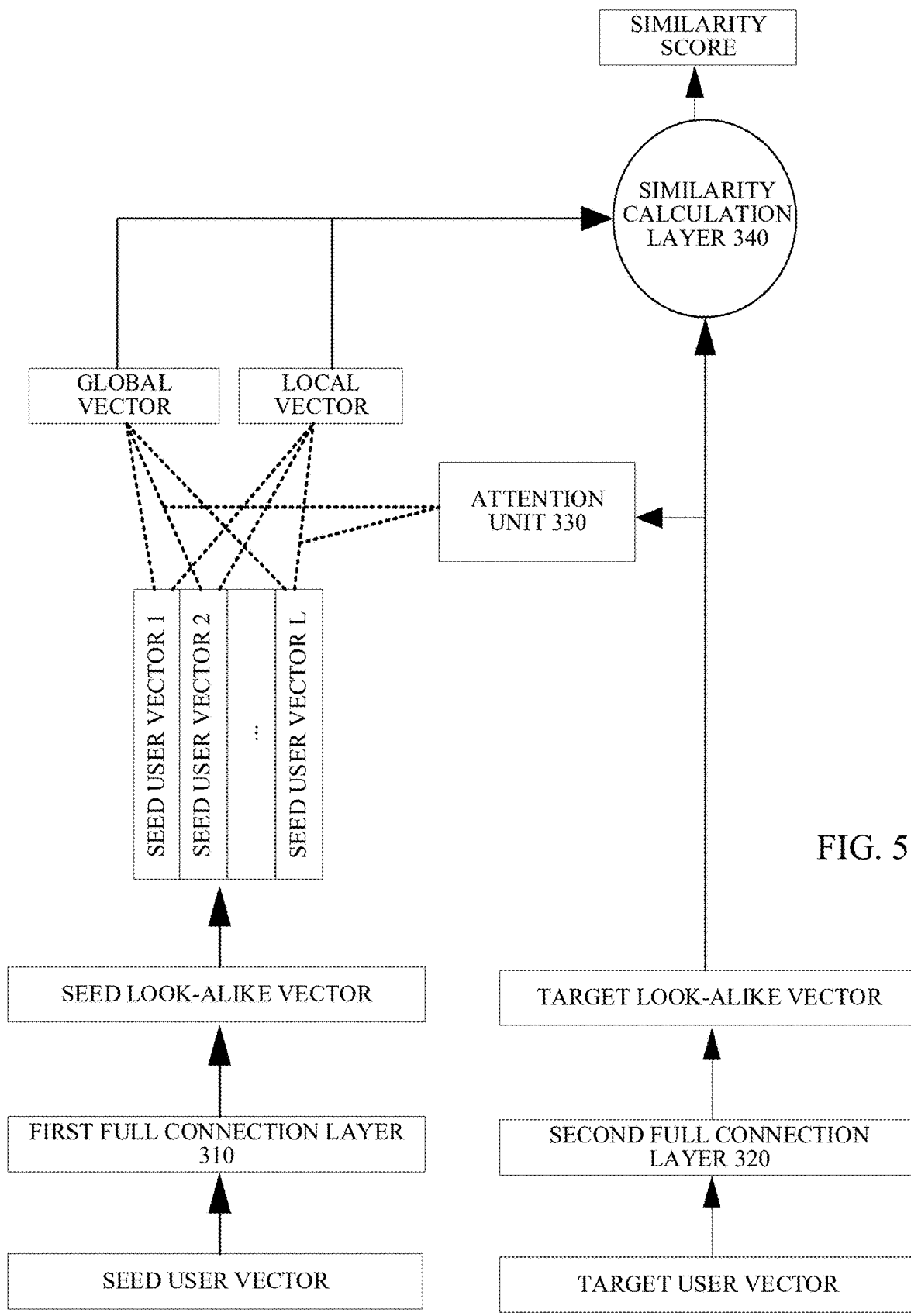
FIG. 5 is a flowchart of a content recommendation method according to another exemplary embodiment of this application.
Figure 6:
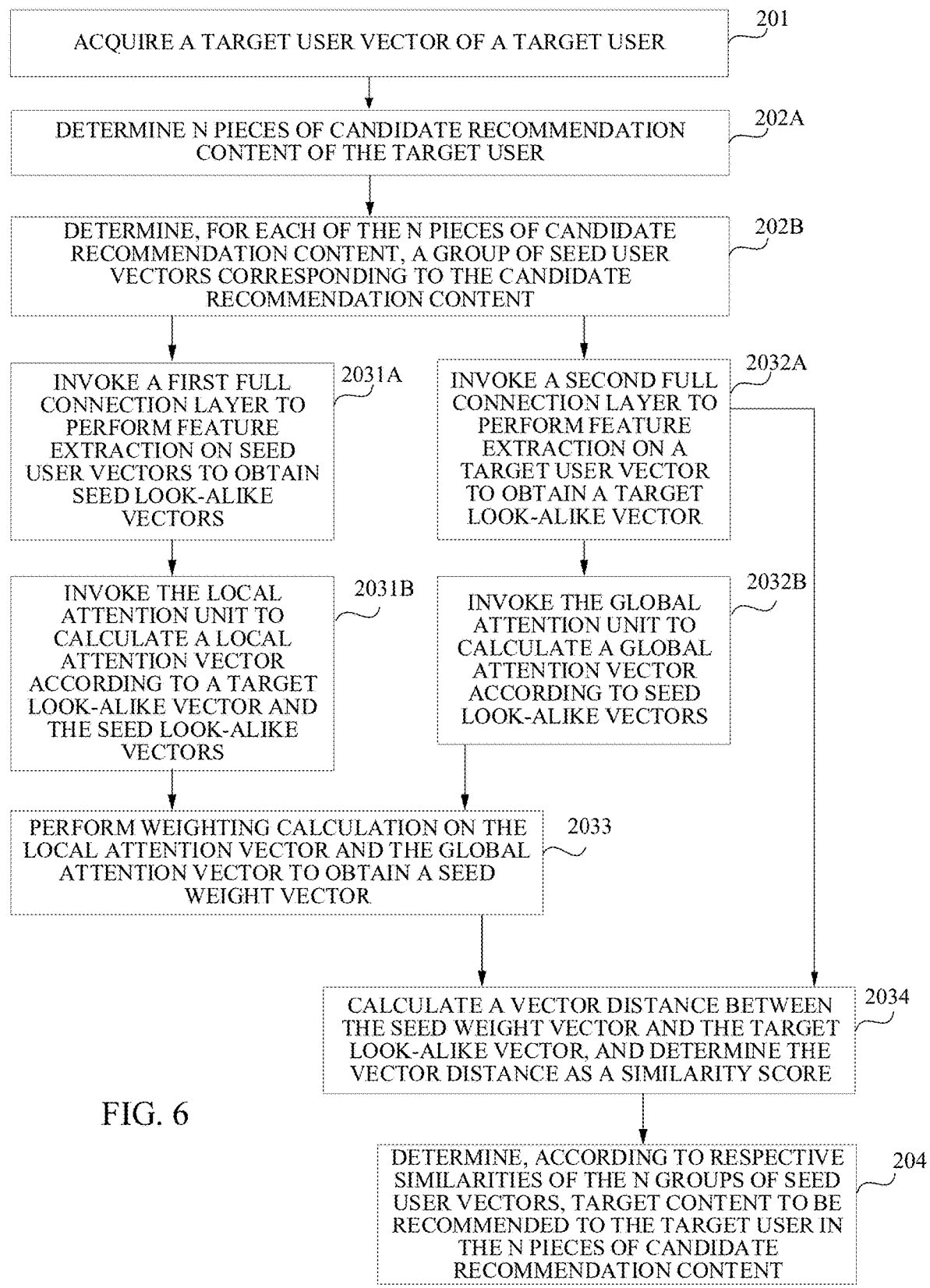
FIG. 6 is a structural diagram of a content recommendation method according to another exemplary embodiment of this application.

In this technical solution, the attention unit based on the attention mechanism is introduced into the look-alike model, and different weights are assigned to different seed users, thereby improving recommendation accuracy of the look-alike model. The following further describes this solution in detail with reference to FIG. 5 and FIG. 6. FIG. 5 shows a flowchart of a content recommendation method according to another exemplary embodiment, and FIG. 6 shows a flowchart of a content recommendation method according to another exemplary embodiment.

With reference to FIG. 5, a tower-like learning model is established. The left side is referred to as a "seed tower", and seed user vectors of n seed users are used as inputs, which is denoted as $R_{seeds} \in R^{n \times m}$, where m represents dimensionality of a seed user vector. The first layer includes a first full connection layer 310 as a transformation matrix, and n×m input matrices of the seed user vectors are transformed into a matrix size of n×h, where h represents dimensionality of transformed seed look-alike vectors. Then, a global attention unit calculates a global vector according to a plurality of seed look-alike vectors, a local attention unit calculates a local vector by using the plurality of seed look-alike vectors and a target look-alike vector, and the global vector and the local vector are combined into one seed weight vector with dimensionality h. The right side is referred to as a "target tower", and a target user vector with dimensionality m is transformed into dimensionality h. At the top of the two towers, a dot product of the seed weight vector and the target look-alike vector is calculated and used for representing a similarity between the seed weight vector and the target look-alike vector. In terms of recommendation, the similarity is essentially a probability that a target user clicks on candidate recommendation content.

A look-alike model includes a first full connection layer 310, a second full connection layer 320, an attention unit 330, and a similarity calculation layer 340. The first full connection layer 310 is invoked to perform feature extraction on seed user vectors to obtain seed look-alike vectors, and the second full connection layer 320 is invoked to perform feature extraction on a target user vector to obtain a target look-alike vector. The first full connection layer 310 and the second full connection layer 320 are respectively used for converting the seed user vectors and the target user vector into vector spaces that can be identified by a neural network.

For example, an interest feature of each piece of candidate recommendation content is represented by using three million seed user vectors corresponding to seed users who have clicked on the candidate recommendation content. On one hand, the three million seed user vectors are inputted into the first full connection layer 310, to extract three million seed user vector features to obtain seed look-alike vectors. On the other hand, the target user vector is inputted into the second full connection layer 320, to extract a target user vector feature to obtain a target look-alike vector. In some embodiments, a process of calculating the seed look-alike vectors and a process of calculating the target look-alike vector are independent of each other. An execution sequence of the two processes is not limited in this embodiment.

In this process, the attention unit 330 calculates a global vector and a local vector according to the seed look-alike vectors and the target look-alike vector, and calculates a seed weight vector according to the global vector and the local vector. A vector distance between the seed weight vector and the target look-alike vector is calculated by using the similarity calculation layer 340, and the vector distance is determined as a similarity between the target user vector and the group of seed user vectors. Then, the content recommendation server 144 makes a content recommendation in descending order of similarities.

In conclusion, in this embodiment, the attention unit calculates the target user vector and a plurality of seed user vectors corresponding to seed users who have clicked on the candidate recommendation content, so that accuracy of the similarities between the seed user vectors and the target user vector can be effectively improved, noise impact from the seed user vectors is reduced, and a degree of interest of the target user in the candidate recommendation content can be more accurately reflected.

FIG. 6 is a flowchart of a content recommendation method according to an exemplary embodiment of this application.

For example, a seed user group of one piece of candidate recommendation content includes L seed users that have interacted with the candidate recommendation content. The seed user group and a target user are usually affected by two factors: One is composition of seed users, and the other is similar user information between the target user and the seed user group.

With reference to FIG. 5, the attention unit 330 in this embodiment includes a local attention unit, configured to: extract a local representation in a seed user vector, and weight a related individual into the target user, so that a representation of the seed user vector changes in different target users. The attention unit 330 in this embodiment further includes a global attention unit, configured to: extract composition of all seed user vectors, weight a representative individual in all the seed user vectors, and punish a noise-involved individual, so as to obtain a more accurate seed vector representation. For example, an execution step of the attention unit includes two branches:

The first branch includes the following steps:

Step 2031a: Invoke a first full connection layer to perform feature extraction on seed user vectors to obtain seed look-alike vectors.

Step 2031b: Invoke the local attention unit to calculate a local attention vector according to a target look-alike vector and the seed look-alike vectors.

$$E_{local_s} = E_s \text{softmax}(\tan h(E_s^T W_l E_u))$$

where $E_s$ represents a seed user vector matrix, $E_u$ represents a target user vector, $W_l$ represents a transformation matrix of a local attention, and $E_{local_s}$ represents a local attention vector obtained by performing weighted summation after final attention calculation.

To calculate a similarity between the seed user vectors and the target user vector, in this embodiment, a plurality of seed user vectors needs to be combined into one, and mean pooling is a common method. In general, in millions of seed user vectors, only a small proportion of seed users' interests may relate to the target user. Therefore, the local attention unit is disposed herein in this embodiment, so as to activate a local interest of a target user and perform adaptive adjustment, and adaptively learn a personalized representation of a seed from the target user.

The second branch includes the following steps:

Step 2032a: Invoke a second full connection layer to perform feature extraction on a target user vector to obtain a target look-alike vector.

Step 2032b: Invoke the global attention unit to calculate a global attention vector according to seed look-alike vectors.

In some embodiments, the global attention unit captures corresponding information to generate a corresponding vector, and a calculation formula is as follows:

$$E_{global_s} = E_s \text{softmax}(E_s^T \tan h(W_g E_s))$$

where Es represents a seed user vector matrix, $W_g$ represents a transformation matrix of a global attention, and $E_{global_s}$ represents a global attention vector obtained by performing weighted summation after final attention calculation.

Step 2033: Perform weighting calculation on the local attention vector and the global attention vector to obtain a seed weight vector.

Step 2034: Calculate a vector distance between the seed weight vector and the target look-alike vector as the similarity between the target user vector and the group of seed user vectors.

The similarity between the two vectors is obtained by using a similarity algorithm. In some embodiments, the similarity between the two vectors is represented by a cosine distance between the two vectors. The cosine distance is calculated by using a product of the target look-alike vector in step 2032 and the seed weight vector in step 2033.

For example, step 2033 and step 2034 may be performed by using the following formula:

$$score_{u,s}=\alpha \cdot cosine(E_u, E_{global_s})+\beta \cdot cosine(E_u, E_{local_s})$$

where $\alpha$ and $\beta$ are addition weights. In an example, $\alpha=0.3$, and $\beta=0.7$.

In conclusion, in this embodiment, the global attention unit and the local attention unit are configured to calculate the seed weight vector. The global attention unit is configured to: learn a global representation of a seed user vector, weight a representative individual, and punish a noise-involved individual, so as to obtain a more accurate global representation; and the local attention unit adaptively learns a seed representation for a specific target user, making seed representations different depending on the audience, thereby significantly improving a representation capability of the seed user vector.

Figure 7:
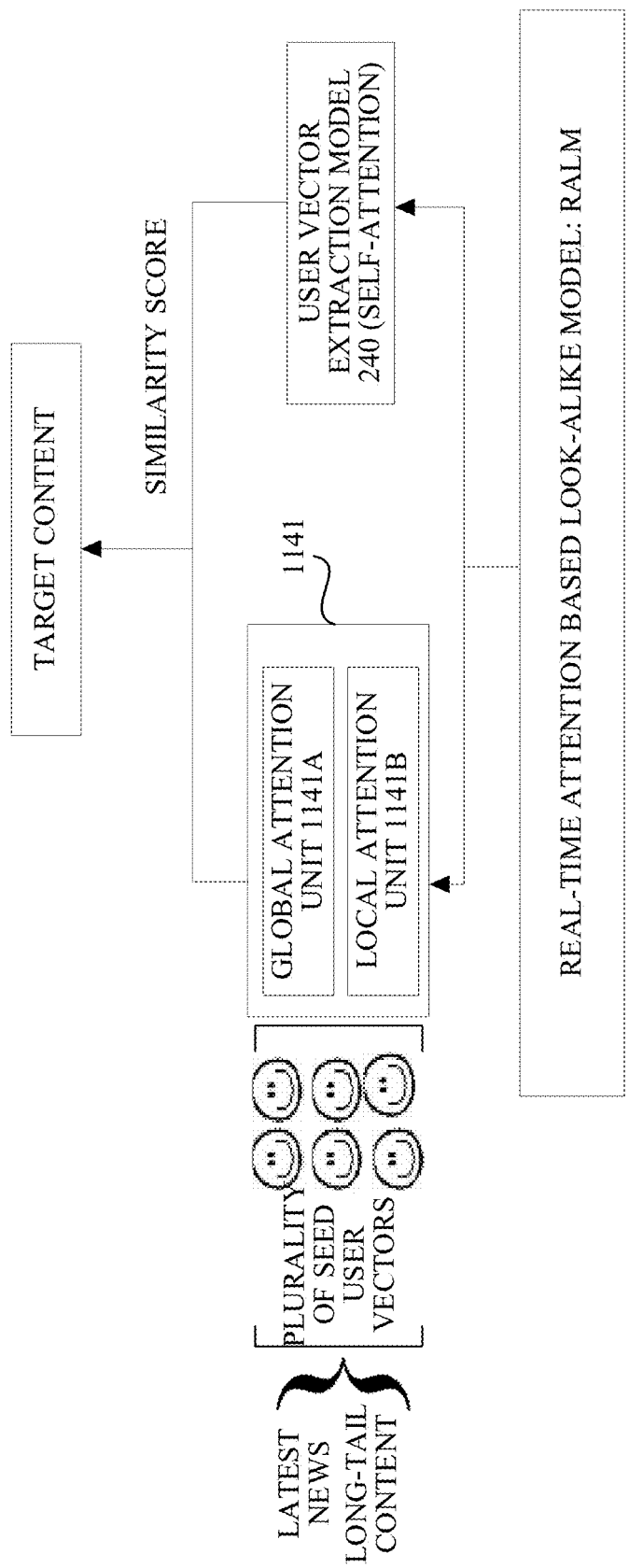
FIG. 7 is a flowchart of a content recommendation method according to another exemplary embodiment of this application.

With reference to FIG. 7, an embodiment of this application provides an RALM, where the RALM includes a user vector extraction model 240 and a look-alike model 1141. The user vector extraction model 240 can extract a target user vector of a target user. The look-alike model 1141 includes a global attention unit 1141a and a local attention unit 1141b.

For example, candidate recommendation content is the latest message or long-tail content. Each latest message or long-tail content corresponds to a group of seed user vectors, and the group of seed user vectors is used for representing an interest feature of the candidate recommendation content. The global attention unit 1141a is configured to calculate a global vector based on a group of seed user vectors. The local attention unit 1141b is configured to calculate a local vector based on a group of seed user vectors and a target user vector. Then, a seed weight vector is calculated based on the global vector and the local vector, and a distance between the seed weight vector and the target user vector is calculated as a similarity. The RALM pushes candidate recommendation content to the target user in descending order of similarities.

The user vector extraction model 240 needs to use as many user feature domains as possible for target user representation learning to improve user interest diversity. A deep learning-based model can model a plurality of features. However, according to the inventor' experiments, a deep model similar to a DNN exhibits worse performance when weak correlation features are input. In addition, strong correlation features such as labels of interest may cause overfitting, and weak correlation features such as shopping interests may even have a certain negative effect. The user vector extraction model 240 using the attention mechanism provided in the embodiments of this application can resolve or alleviate these problems.

Figure 8:
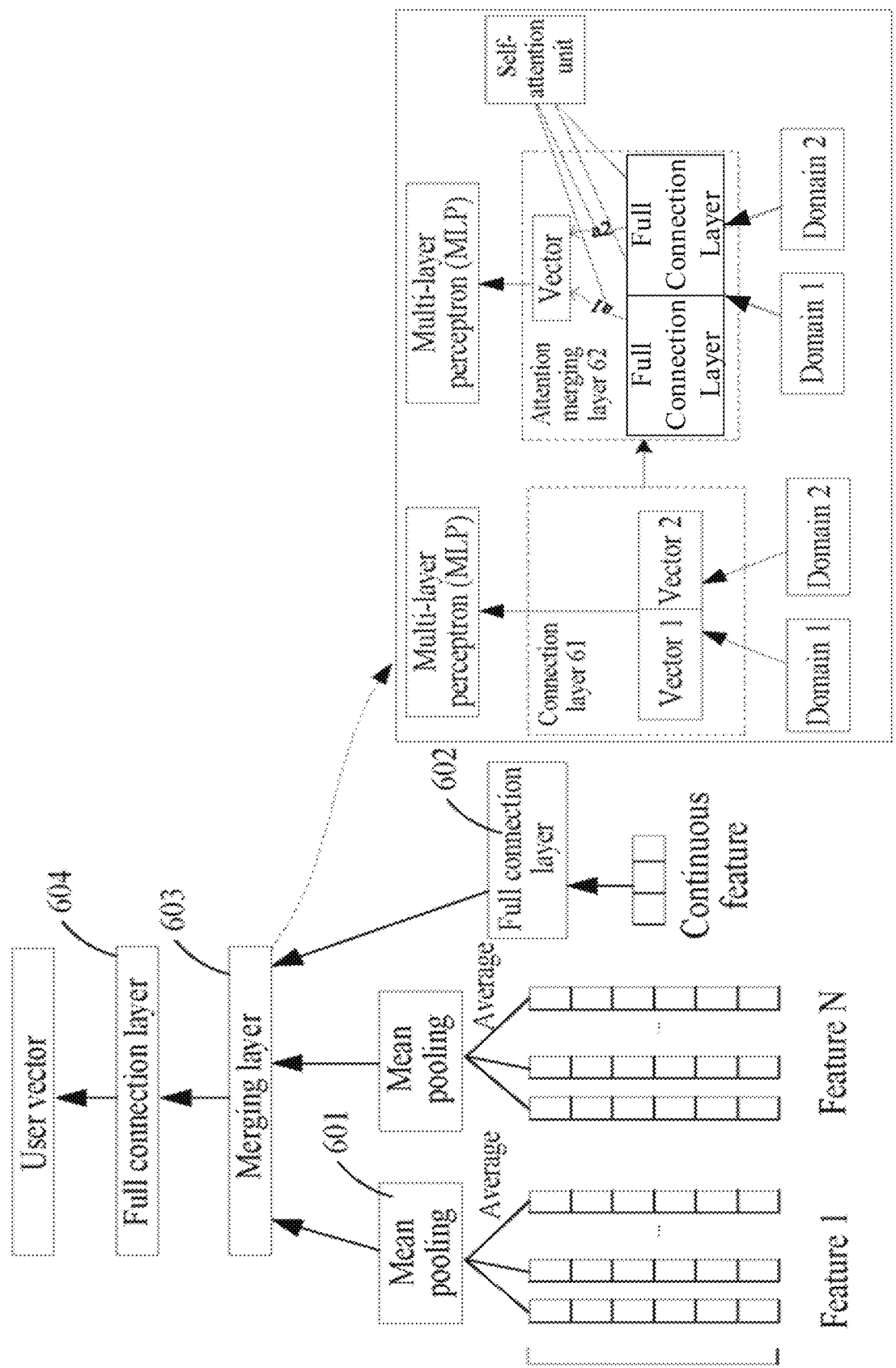
FIG. 8 is a diagram of a process of extracting a user vector in a content recommendation method according to an exemplary embodiment of this application.

FIG. 8 shows a flowchart of a method for generating a user vector according to an exemplary embodiment. The method may be used for generating a user vector of each user, such as a target user vector of a target user and a seed user vector of a seed user.

In an example of this embodiment, a user feature of a user includes at least one of a discrete feature and a continuous feature.

In some embodiments, the user feature includes, but is not limited to: at least one of a population attribute feature, a device feature, a historical behavior feature, and a label feature. In an example, the discrete feature includes the population attribute feature, the device feature, and the label feature; and the continuous feature includes the historical behavior feature.

The population attribute feature is used for indicating a feature of a user on a character base attribute. For example, the population attribute feature includes, but is not limited to: at least one of gender, age, education background, marital status, address, and income. Gender may be considered as a domain (or a user feature domain), age may be considered as a domain, education background may be considered as a domain, and the like. A domain is a factor that generates a holistic distribution deviation on a sample subset in a training set. For example, for face recognition, hair colors of different users, black, yellow, and white, may be considered as a domain difference; whether different users wear glasses may also be considered as a domain difference; and whether different users have beards is also considered as a domain difference.

The device feature is used for indicating a feature of an electronic device used by a user. For example, the device feature includes, but is not limited to: at least one of a hardware model, an operating system type, a manufacturer, a country version, a unique hardware identifier code, and a network address.

The historical behavior feature is used for representing a feature generated by various behaviors when a user uses an Internet service. For example, the historical behavior feature includes, but is not limited to: at least one of a read behavior, a like behavior, a reply behavior, a share behavior, a purchase behavior, a network social behavior, and a join member behavior.

The label feature is a feature that is labeled by a system or another user to the user. The label feature may be a label of interest of the user, a shopping interest label, a click interest label, or the like. For example, the label feature includes, but is not limited to: humorous, kind, post-90s generation, Taurus, gourmet food, difficult-to-get-up, indoorswoman, Korean drama fan, travel, and perfectionism.

In some embodiments, the population attribute feature, the device feature, the behavior feature, and the label feature are all represented by using vectors.

A user vector extraction model 240 includes an embedding layer (including a mean pooling layer 601 and a full connection layer 602), a merging layer 603, and a full connection layer 602.

The user vector extraction model 240 converts the discrete feature into a vector form by using the mean pooling layer 601, converts the continuous feature into a vector mode by using the full connection layer 602, and inputs a user feature in a vector form into the merging layer 603. The merging layer 603 is a neural network layer based on a self-attention mechanism. A weight of each user feature in a vector form extracted from a feature input layer is calculated by using the merging layer 603, and weighted fusion is performed to obtain a user vector 604 that is more representative of a user interest of a current user.

The merging layer 603 inputs an output result into the full connection layer 602, where the full connection layer 602 is used for capturing a nonlinear association relationship of each vector, and finally outputs a user vector 604 that is most representative of the user interest.

In an example of this embodiment, the merging layer 603 may be implemented based on an improved multi-layer perceptron (MLP). A comparison between a basic MLP and the improved MLP in this embodiment is shown in the lower right block of FIG. 8.

The basic MLP includes a connection layer 61 and an MLP layer. Vector representations of user features of a plurality of domains are connected as one wide dense layer vector (including a vector 1 and a vector 2 in FIG. 8) by using the connection layer 61, and the wide dense layer vector is inputted into the MLP layer for processing. By observing a training process of the basic MLP, the inventor finds that weight optimization of the training process is always overfitted to some specific domains, and these specific domains are closely related to an interest of a target user in content (for example, a label of interest). As a result, a recommendation result is always determined by using a strong correlation feature, and a contribution of a weak correlation feature to a recommendation process is insufficient. For example, a contribution of a user's shopping interest to the recommendation process is insufficient. Therefore, the basic MLP cannot fully understand multidomain features, resulting in a lack of diversity of a final recommendation result.

The improved MLP includes an attention merging layer 62 and an MLP layer. The attention merging layer 62 includes a plurality of parallel full connection layers and self-attention units. A quantity of full connection layers is the same as a quantity of user feature domains. After a user feature vector of each domain is connected by using the full connection layer, the self-attention unit learns personalized distribution of weights (for example, a1 and a2 in the figure) according to a context user feature, so as to activate different locations of neurons corresponding to different domains, so as to ensure that both a strong correlation feature and a weak correlation feature can effectively function.

In conclusion, in the method provided in this embodiment, the attention merging layer 62 can ensure that both a strong correlation feature (for example, a label of interest) and a weak correlation feature (for example, a shopping interest) can contribute to the recommendation process, thereby improving accuracy of a user feature vector extracted from the user vector extraction model, and implementing a content recommendation effect of recommending different content to different users.

Figure 9:
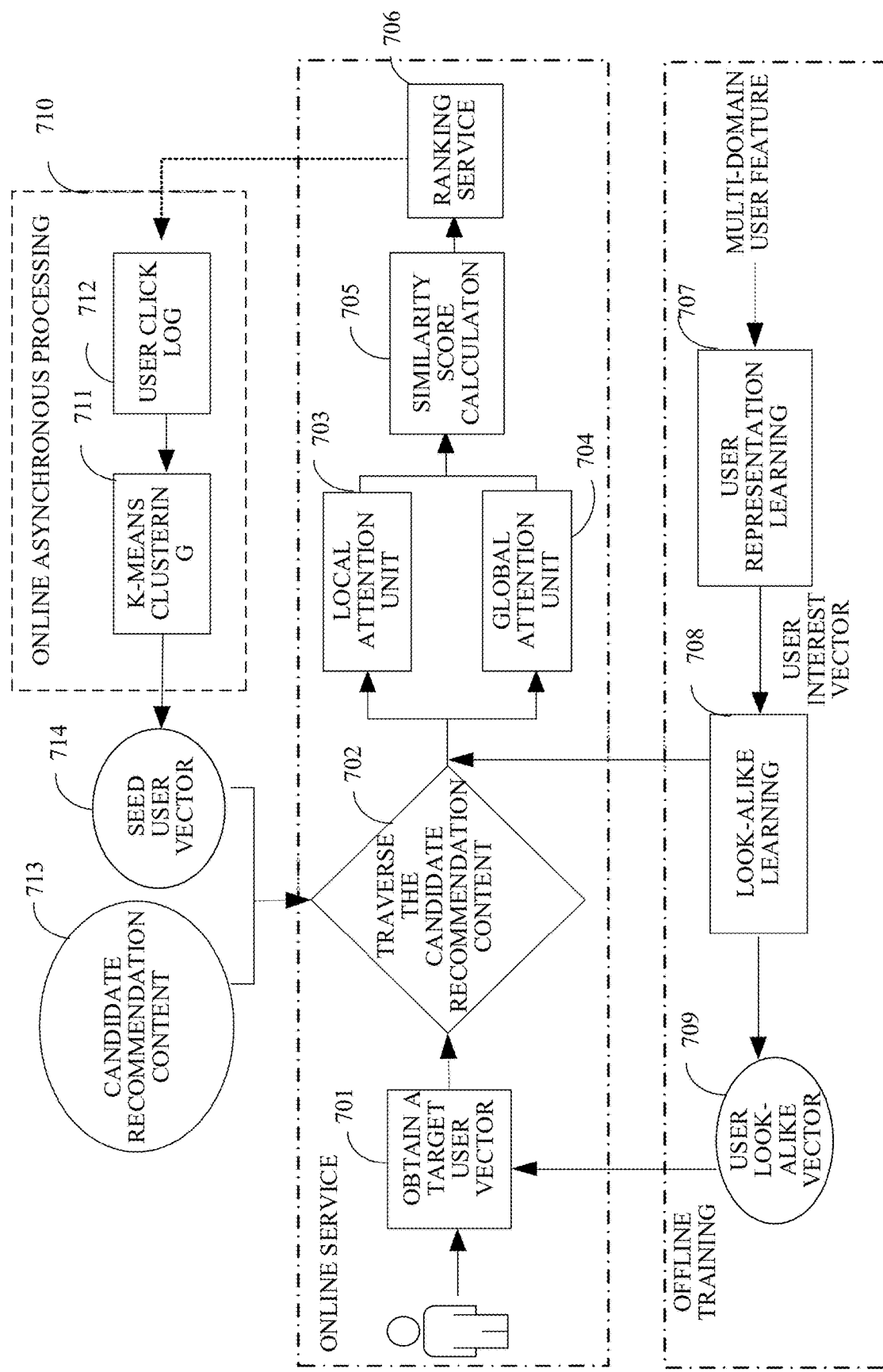
FIG. 9 is a diagram of interface content of a neural network model after recommendation according to another exemplary embodiment of this application.

FIG. 9 shows a flowchart of a content recommendation method according to an exemplary embodiment. The method includes an online service phase, an online asynchronous processing phase, and an offline training phase.

Online Service Phase

It is the prediction process described in the embodiments of FIG. 3, FIG. 4, and FIG. 6. The online service phase includes the following steps: Step 701. Acquire a target user vector of a target user. Step 702. Determine n pieces of candidate recommendation content corresponding to the target user according to the target user vector, and traverse the candidate recommendation content, where each target user may correspond to a plurality of pieces of candidate recommendation content. A content recommendation server compares a plurality of seed user vectors 714 corresponding to each piece of candidate recommendation content 713 with the target user vector. In a comparison process, a local attention unit 703 and a global attention unit 704 are used for performing feature extraction, and different weights are assigned to the seed user vectors in different dimensions according to a feature of the target user vector. Step 705. Calculate similarity scores between the target user vector and the plurality of seed user vectors representing the candidate recommendation content. Step 706. Perform ranking according to the similarity scores of each piece of candidate recommendation content, and recommend content to the target user in descending order of similarity scores.

Online Asynchronous Processing Phase

To ensure that content such as news information can be quickly exposed in real time, a recommendation system shown in FIG. 9 further includes a user feedback monitoring module. After one piece of recommendation content is pushed to a plurality of target users, many interactive users (for example, users who have clicked on the recommendation content) are generated every second. The user feedback monitoring module acquires a user click log 712 in real time, and collects a user who has recently clicked on the recommendation content as a seed user. Therefore, a seed user list corresponding to each piece of candidate recommendation content is updated in real time.

For example, the user feedback monitoring module updates, in real time, a seed user list and a seed user vector that are corresponding to candidate recommendation content in inventory. To prevent a problem that a content recommendation server 114 becomes overburdened when performing subsequent clustering calculation on seed user vectors because too many users click on the candidate recommendation content in a short time, a seed user group corresponding to each piece of candidate recommendation content retains only three million users that have recently generated an interaction behavior. Certainly, a quantity of retained users for each piece of candidate recommendation content may be three million, or may be another quantity. A specific parameter is set by a technician. The interaction behavior includes at least one of clicking, reading, liking, commenting, and forwarding.

In addition, for one piece of candidate recommendation content 713, in the foregoing embodiment, three million users who have recently clicked on the candidate recommendation content are selected as seed users, and similarity scores between seed user vectors of the three million seed users and the target user vector are calculated by using an attention-based look-alike model 1141. Because a calculation amount of calculating three million seed user vectors for each piece of candidate recommendation content is very large, to reduce a calculation amount and a calculation time of the look-alike model 1141, optionally in this embodiment, a calculating burden of the look-alike model 1141 may be reduced in a clustering manner.

In some embodiments, in this embodiment, a target clustering algorithm 711 (for example, K-means clustering) is used for performing clustering processing on seed user vectors in the same group. For an $i^{th}$ group of seed user vectors in n groups of seed user vectors, L seed user vectors in the $i^{th}$ group of seed user vectors are clustered into K seed user vectors, K being less than L, and i being less than or equal to n.

For example, a clustering method includes: clustering the L seed user vectors into K sets by using a K-means clustering algorithm, and averaging at least two seed user vectors in the same set to obtain a seed user vector corresponding to the set. Using an example in which L is three million, and K is 300, in the K-means clustering process, three million seed user vectors corresponding to one piece of candidate recommendation content can be clustered into 300 seed user vectors. Alternatively, for each of the K sets, a seed user vector that is in the set and located at a cluster centroid is determined as a seed user vector corresponding to the set.

When candidate recommendation content corresponds to L seed user vectors, the L seed user vectors are asynchronously clustered into K seed user vectors. Because K is less than L, a quantity of times of calculation is reduced to K/L of the original quantity of times of calculation, thereby effectively reducing a calculation amount of a neural network model.

In an example of this application, when there are more than two seed users: seed user 1, seed user 3, ..., and seed user x, a seed user vector of the seed user 1 is [0.1, 0.2, 0.8, 0.9, 0.2, 0.4, 0.6], and a seed user vector of the seed user 3 is [0.8, 0.2, 0.2, 0.2, 0.0, 0.6, 0.6], ..., and a seed user vector of the seed user x is [0.5, 0.7, 0.2, 0.5, 0.6, 0.7, 0.8]. A user vector of each seed user is an M-dimensional vector, $i^{th}$ dimension values in each M-dimensional user vector are averaged, where $1 \le i \le M$, and then combined to obtain a new M-dimensional vector as a user feature of the seed user. For example, first dimension values in each seed user vector, that is, 0.1, 0.8, ..., and 0.5, are averaged, so as to obtain a first dimension value 0.45 in a clustered seed user vector. The rest can be deduced by analogy.

In another example of this application, although the seed user vector is continuously updated in real time, each time a new seed user vector is inserted, a seed user vector cluster obtained through K-means clustering does not need to be updated immediately. The recommendation system may run the K-means algorithm every five minutes (or another time interval), and store a cluster centroid vector that is in each seed user vector cluster and obtained through clustering as a clustered seed user vector into a database for use in an online prediction process.

The clustered seed user vector is defined as:

$$R_{seeds} = \{E_{centroid1}, E_{centroid2}, \ldots, E_{centroidk}\};$$

where $E_{centroidk}$ is a cluster centroid vector of a kth seed user vector cluster obtained through K-means clustering.

The K-means clustering algorithm is merely an example for description. Another clustering algorithm such as mean-drift clustering, density-based spatial clustering of applications with noise (DBSCAN), or Gaussian mixture model (GMM) clustering may also reduce the calculation amount of the neural network model. This is not limited in this embodiment.

In conclusion, in the method provided in this embodiment, a seed user vector in the online asynchronous processing process is updated in real time, so that enough user historical data can be collected for breaking news as soon as possible, and therefore, the breaking news is recommended to a target user as candidate recommendation content as soon as possible. It is also possible to recommend high-quality articles of a small audience to a potentially interested target user as soon as possible based on a seed user vector of a user who has recently clicked on the high-quality articles of a small audience.

According to the method provided in this embodiment, a large quantity of seed user vectors in a group are clustered by using the K-means algorithm, so as to obtain a reduced quantity of seed user vectors, thereby greatly reducing the calculation amount of the content recommendation server during calculation of similarity scores.

Offline Training Phase

This phase is a phase in which the user vector extraction model 240 and the look-alike model 1141 are trained by using a training set.

A process of training the user vector extraction model 240 may be referred to as user representation learning 707. In this phase, a user feature of each user and an interaction behavior of each user (such as reading an article, watching a video, and subscribing to an official account) for recommendation content are inputted into an offline training server as samples, and the user vector extraction model 240 is trained by using an error back propagation algorithm.

A process of training the look-alike model 1141 may be referred to as look-alike learning 708. A user vector that is generated by user representation learning 707 and that can represent a user interest is used as input content for look-alike learning 708, historical clicks of the user are used as samples to train the user vector 709, and a click is used as a positive sample and a non-click is used as a negative sample, to adjust a weight of each neural network layer in the look-alike model 1141 according to error back propagation.

The following separately describes the training process of the user vector extraction model 240 and the training process of the look-alike model 1141 by using two different embodiments.

Figure 10:
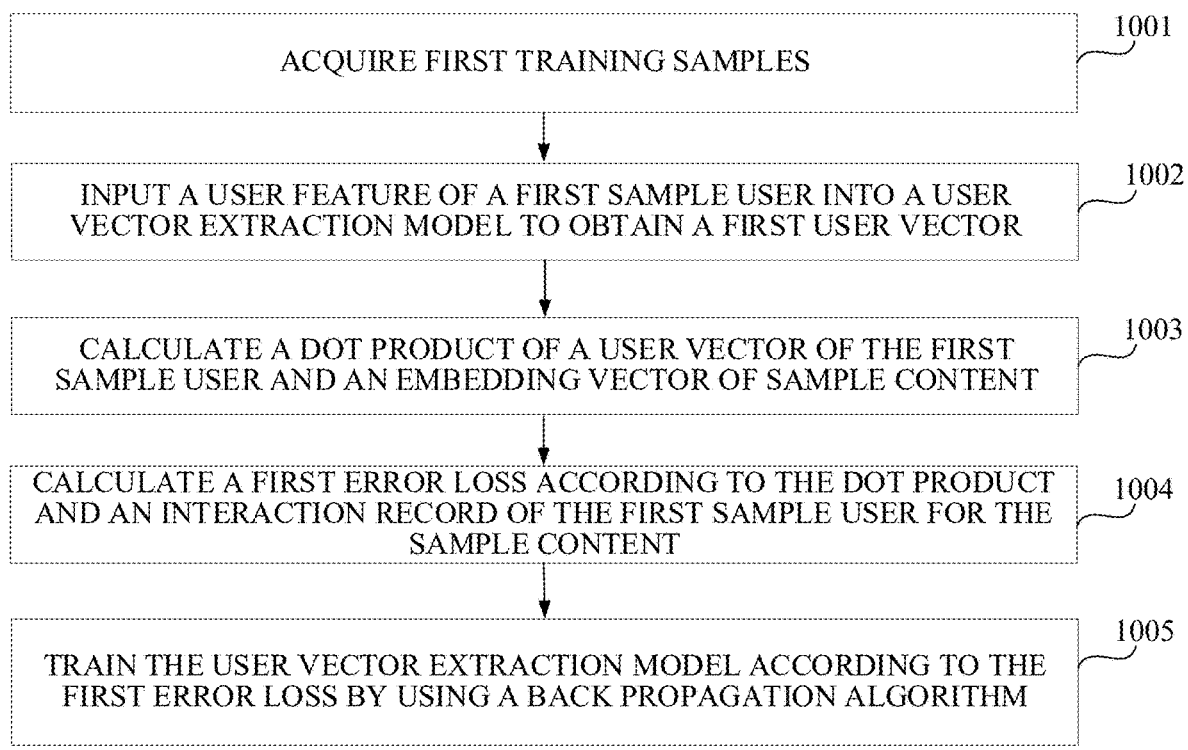
FIG. 10 is a flowchart of a process of acquiring a user vector according to an exemplary embodiment of this application.

FIG. 10 shows a flowchart of a training method for a user vector extraction model according to an exemplary embodiment of this application. The method may be performed by a content recommendation server 114 or an additional offline training server. The user vector extraction model includes an embedding layer, a merging layer, and a full connection layer, where the merging layer is a neural network layer based on a self-attention mechanism. The training method includes the following steps:

Step 1001: Acquire first training samples, the first training samples including user features of a plurality of sample users and interaction records of the plurality of sample users for sample content.

The first training samples include the user features of the sample users, an embedding vector of the sample content, and the interaction records of the sample users for the sample content. The interaction record includes at least one of click, like, comment, and forward.

Step 1002: Input a user feature of a first sample user into the user vector extraction model to obtain a first user vector.

Figure 11:
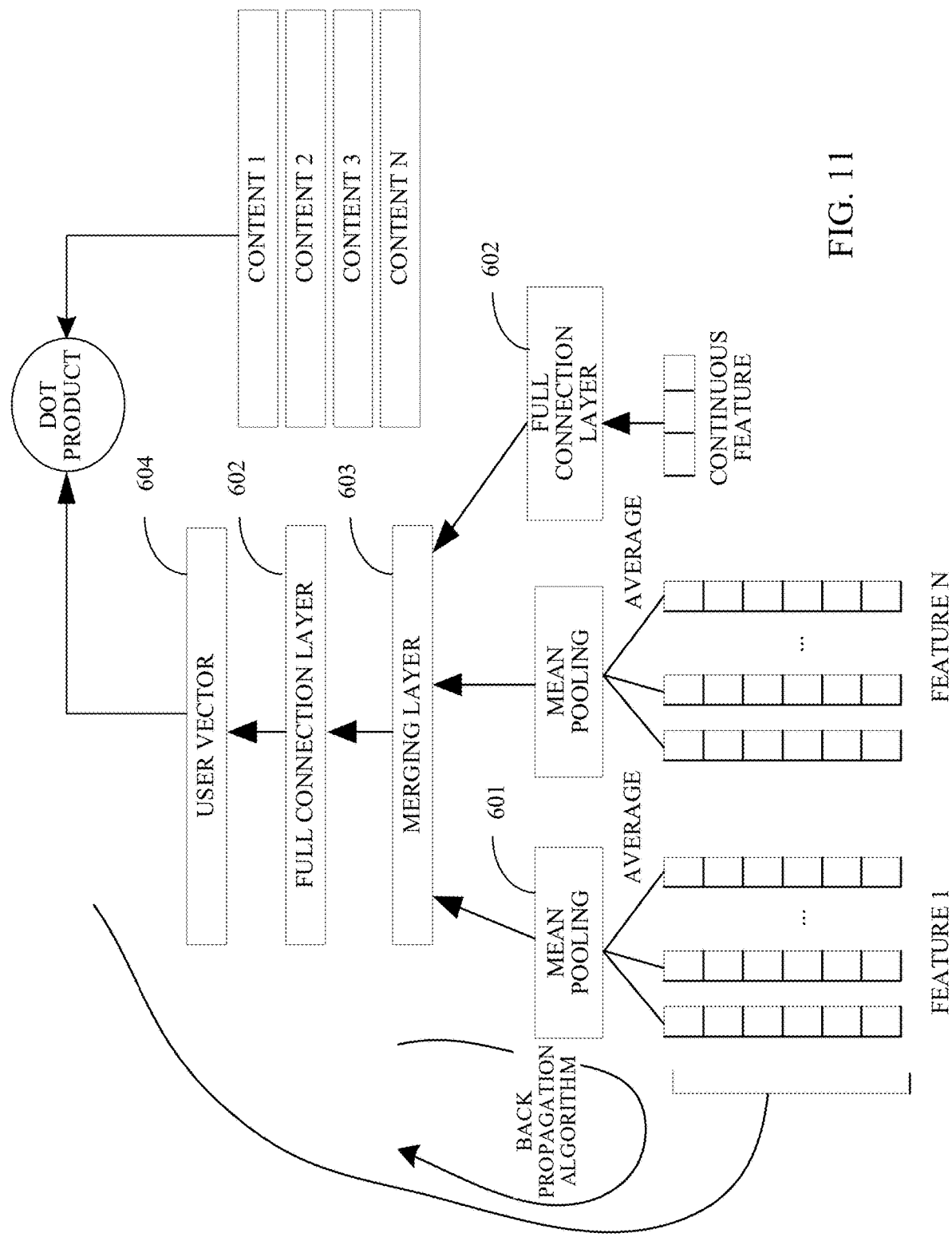
FIG. 11 is a flowchart of a method for acquiring a user vector in a neural network model according to an exemplary embodiment of this application.

With reference to FIG. 11, it may be learned that the user vector extraction model includes an embedding layer (including a mean pooling layer 601 and a full connection layer 602), a merging layer 603, and a full connection layer 602. In some embodiments, the merging layer 603 includes an attention merging layer and an MLP layer.

A discrete feature of the first sample user is embedded and inputted into the mean pooling layer 601 and then is converted into a vector form, a continuous feature is converted into a vector form through the full connection layer 602, and the user features in the vector form are inputted into the merging layer 603, where the merging layer 603 is a neural network model based on a self-attention mechanism.

A weight of each user feature in a vector form is calculated by using the merging layer 603, and weighted fusion is performed to obtain a first user vector that is representative of a user interest of the first sample user. The first sample user is any one of the plurality of sample users in the first training sample.

Step 1003: Calculate a dot product of the first user vector and an embedding vector of the sample content.

Step 1004: Calculate a first error loss according to the dot product and an interaction record of the first sample user for the sample content.

A method for selecting sample content from a plurality of pieces of existing candidate content may be considered as: selecting one piece of content of interest from millions of pieces of candidate content by using user representation learning as multi-category learning. To improve training efficiency, during calculation of the first error loss, in this application, negative sampling is used instead of a conventional normalized exponential Softmax function. Obviously, if candidate content is randomly selected as a negative sample, sampling distribution deviates from an actual condition. Therefore, this embodiment develops a loss function similar to noise comparison estimation, that is, a loss function indicated by Google in Word2vec. To simulate unbiased distribution, in this embodiment, all pieces of candidate content are first ranked by the frequency of occurrence, and then a probability that each piece of candidate content is used as the sample content is calculated according to ranking of the candidate content:

$$p(x_i)=[\log(k+2)-\log(k+1)]/\log(D+1);$$

where $x_i$ represents an $i^{th}$ piece of candidate content, k represents a rank of the $i^{th}$ piece of candidate content, D represents a maximum rank of all candidate content, and $p(X_i)$ indicates a probability that the $i^{th}$ piece of candidate content is selected as a negative sample. When the most active user behavior is used for leading a training loss, in this embodiment, the maximum quantity of positive samples of each candidate user is limited to 50, and a positive-negative ratio of the samples is 1/10. Then, the Softmax function is used for normalizing a probability that c is selected for the $i^{th}$ piece of candidate content according to a feature U of a candidate user and a feature of the $i^{th}$ piece of candidate content.

$$P(c = i \mid U, X_i) = \frac{e^{x_i u}}{\sum_{j \in X} e^{x_j u}}$$

where $u \in R^N$ represents a high-dimensional embedding vector of the first sample user, and $x_j \in R^N$ represents embedding vectors of all sample content. In an example of this application, an embedding vector of sample content is generated by a deep prediction neural network, where e is a natural constant, and the prediction neural network may be a neural network used for prediction in the related art. In addition, in this embodiment, explicit feedback and implicit feedback are used as examples to ensure diversity of recommendation results. All types of content such as articles, videos, and website behaviors will be considered.

It is assumed that the first sample user generating an interaction behavior on the sample content is used as a positive sample, and the first sample user not generating an interaction behavior on the sample content is used as a negative sample. The offline training server calculates a first error loss between the dot product and the positive sample (or the negative sample).

It is assumed that the vector u is the high-dimensional embedding vector of the first sample user, and xi represents an embedding vector of $i^{th}$ piece of sample content. In this embodiment, $P(c=i|U, X_i)$ and a cross entropy loss are calculated:

$$L = -\sum_{j \in X} y_i \log P(c = i \mid U, X_i)$$

where $y_i \in \{0, 1\}$ indicates a label, 0 indicates a non-click behavior, and 1 indicates a click behavior. An ADAM optimizer is used for minimizing the error loss. When the error loss converges, an output of the last layer is used as the user vector of the user (the target user vector of the target user or the seed user vector of the seed user).

Step 1005: Train the user vector extraction model according to the first error loss by using a back propagation algorithm.

For example, the offline training server performs back propagation on the prediction error by using a back propagation algorithm based on gradient descent, so as to update a weight in the neural network model.

Inputting a group of training samples into the user vector extraction model for training is considered as a training process. After the training process ends, the offline training server determines whether the current training process meets a training termination condition. The training termination condition includes, but is not limited to, the following two cases:

1. The prediction error is less than a specified threshold;
    where the specified threshold is preset by a technician, or is adjusted at any time according to the training process.
2. A quantity of times of training is greater than a specified quantity of times.

In some cases, long-term training cannot make the prediction error less than a specified threshold. Therefore, the training termination condition may be alternatively set according to a quantity of times of training. For example, if the quantity of times of training reaches 10,000, training is stopped.

When the training termination condition is not met in the current training process, back propagation is performed on the prediction error according to the back propagation algorithm, and the weight in the user vector extraction model is updated. When the training termination condition is met in the current training process, training of the user vector extraction model ends.

In conclusion, in the training method for the user vector extraction model provided in this embodiment, the merging layer is used for performing feature extraction on user features of a plurality of domains based on the self-attention mechanism. By using the merging layer, it can be ensured that both a strong correlation feature (for example, a label of interest) and a weak correlation feature (for example, a shopping interest) can contribute to the recommendation process, thereby greatly improving representation accuracy of a user vector extracted from the user vector extraction model.

Figure 12:
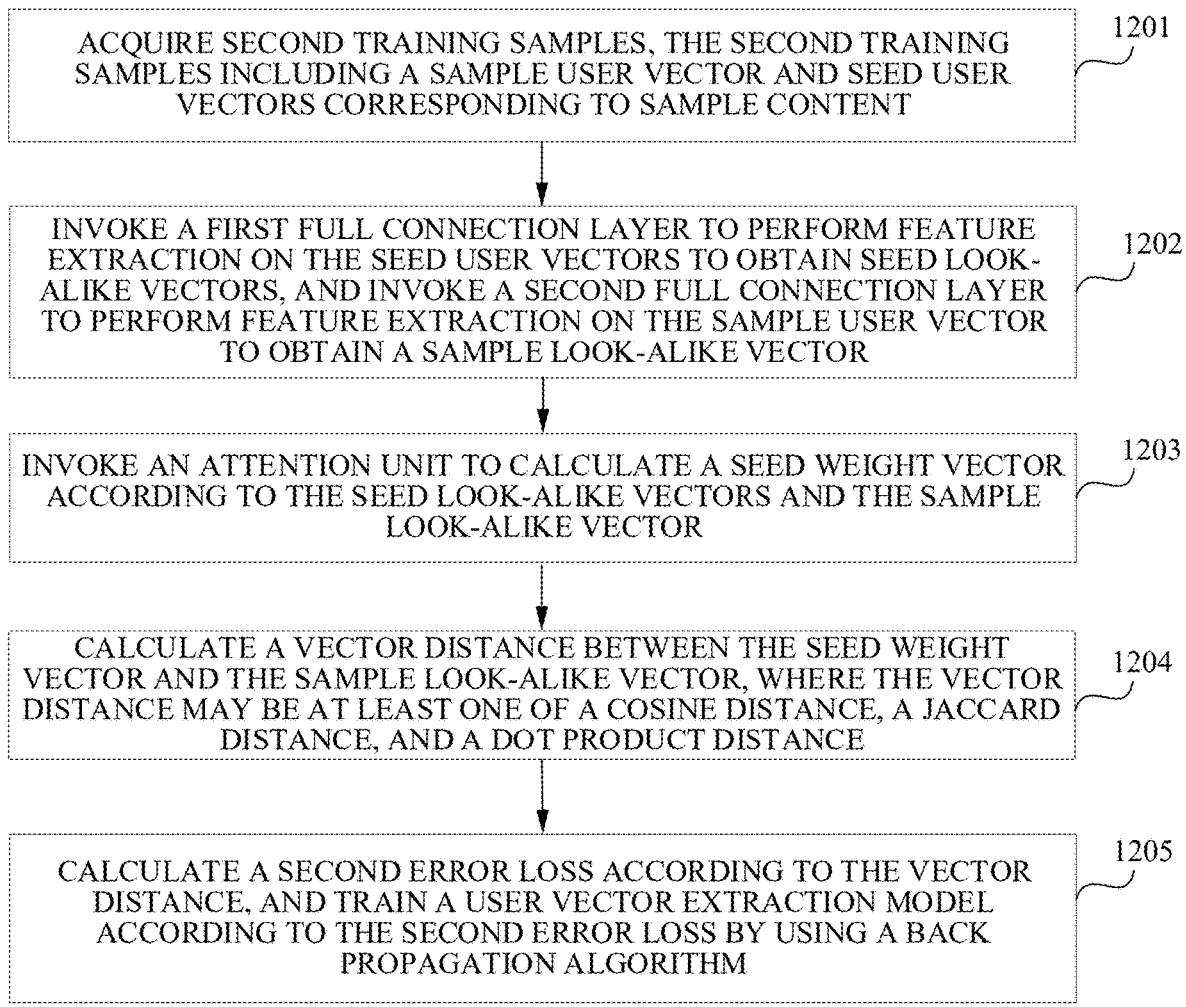
FIG. 12 is a flowchart of a training method for a look-alike model according to an exemplary embodiment of this application.

FIG. 12 shows a flowchart of a training method for a look-alike model 1141 according to an exemplary embodiment of this application. The method may be performed by a content recommendation server 1141 or an additional offline training server. The look-alike model includes a first full connection layer, a second full connection layer, and an attention unit. The training method includes the following steps:

Step 1201: Acquire second training samples, the second training samples including a sample user vector and seed user vectors corresponding to sample content.

The sample content may be an article, an advertisement, news, or the like, and a quantity of second training samples for training the look-alike model is determined by a technician. This is not limited in this embodiment.

Seed user vectors corresponding to each piece of sample content are user vectors of users who have generated an interaction behavior with the sample content.

Step 1202: Invoke the first full connection layer to perform feature extraction on the seed user vectors to obtain seed look-alike vectors, and invoke the second full connection layer to perform feature extraction on the sample user vector to obtain a sample look-alike vector.

Step 1203: Invoke the attention unit to calculate a seed weight vector according to the seed look-alike vectors and the sample look-alike vector.

In some embodiments, the attention unit includes a global attention unit and a local attention unit.

Figure 13:
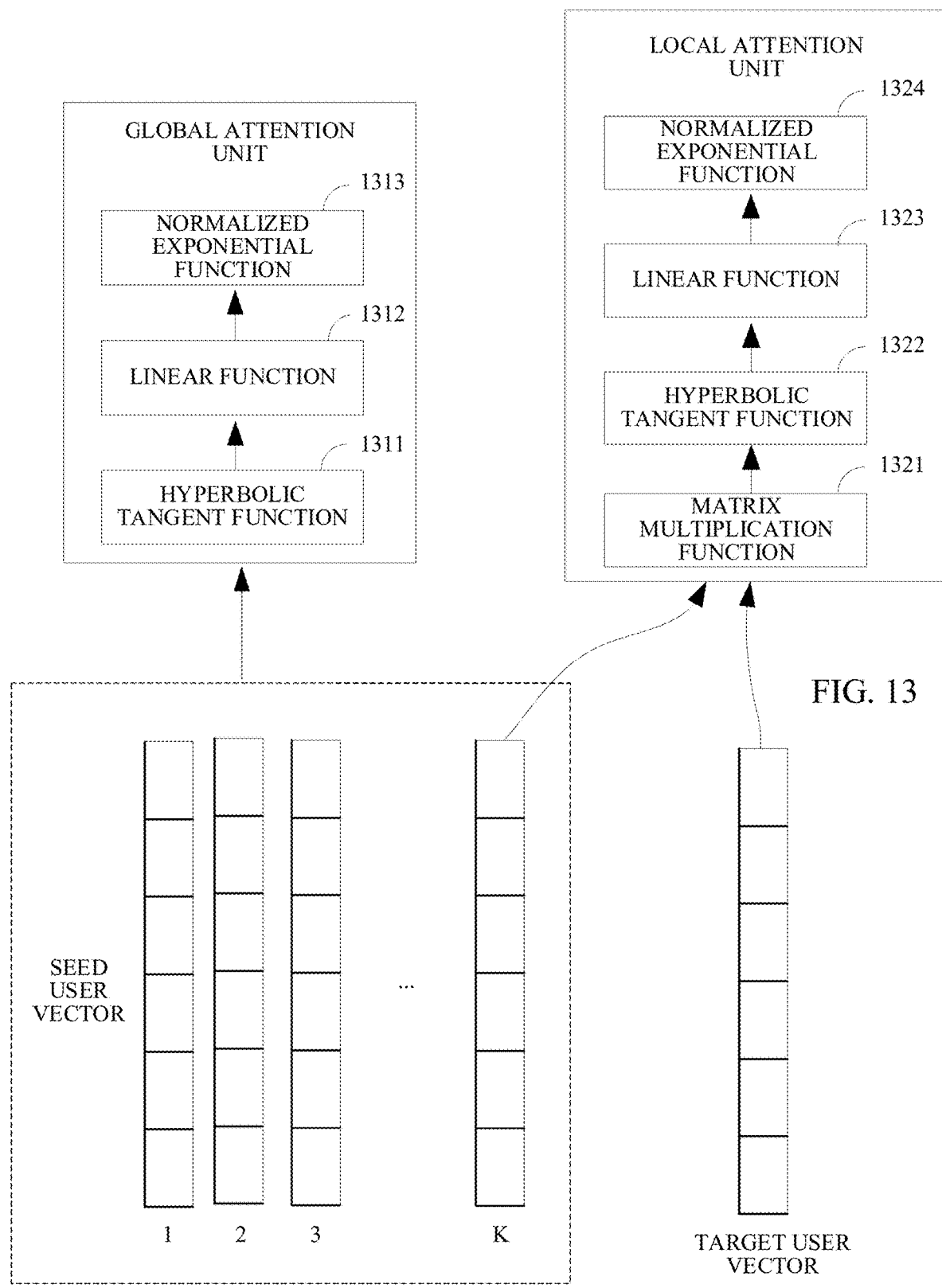
FIG. 13 is a structural diagram of an attention unit according to an exemplary embodiment of this application.

With reference to FIG. 13, the global attention unit in this embodiment of this application includes a hyperbolic tangent function 1311, a linear function 1312, and a normalized exponential function 1313. The local attention unit in this embodiment of this application includes a matrix multiplication function 1321, a hyperbolic tangent function 1322, a linear function 1323, and a normalized exponential function 1324.

The offline training server sequentially processes the seed look-alike vectors by using the hyperbolic tangent function 1311, the linear function 1312, and the normalized exponential function 1313 in the global attention unit to obtain a global vector.

The offline training server sequentially processes the seed look-alike vectors and the sample look-alike vector by using the matrix multiplication function 1321, the hyperbolic tangent function 1322, the linear function 1323, and the normalized exponential function 1324 in the local attention unit to obtain a local vector.

The offline training server performs weighted summation on the global vector and the local vector to obtain a seed weight vector.

Step 1204: Calculate a vector distance between the seed weight vector and the sample look-alike vector.

The vector distance may be at least one of a cosine distance, a Jaccard distance, and a dot product distance.

Step 1205: Calculate a second error loss according to the vector distance, and train the look-alike model according to the second error loss by using a back propagation algorithm.

In this embodiment, a Sigmoid cross entropy function is used as a loss function:

$$L = -\frac{1}{N} \sum_{x,y \in D} (y \log p(x) + (1-y) \log(1 - p(x)))$$

where D represents a training set, x represents an input sample user vector, y is a label in {0, 1}, 0 represents a non-click behavior of the sample user, 1 represents a click behavior of the sample user, and p(x) is a similarity score between the seed user vector and the sample user vector predicted by using the Sigmoid function. N represents a quantity of users in the training set.

Figure 14:
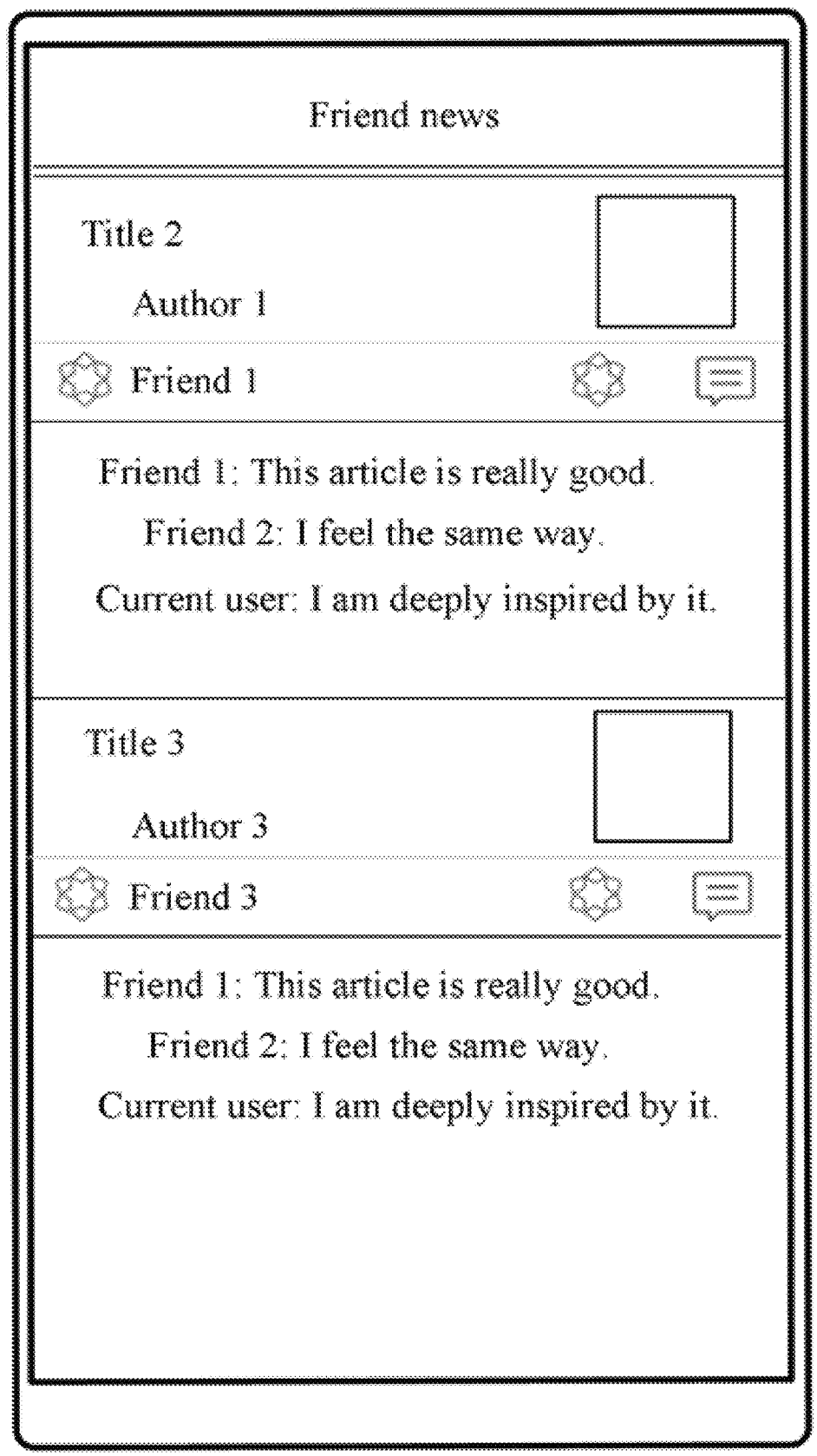
FIG. 14 is an interface diagram of content recommendation according to an exemplary embodiment of this application.

FIG. 14 shows an interface diagram of a content recommendation result according to an exemplary embodiment of this application. The content recommendation method in the foregoing implementation may be applied to a document recommendation application, such as news recommendation or article recommendation. For example, the document recommendation application may be a news subprogram in social software. The document recommendation application calculates a target user vector of a target user and candidate recommendation content according to an historical interaction between the target user and a document, and recommends a related document to the target user by using the foregoing content recommendation method.

The content recommendation method in the foregoing implementation may also be applied to a video recommendation application, and the video recommendation application recommends related video content to the target user according to an historical interaction between the target user and a video.

In some embodiments, an interaction manner includes at least one of like, favorite, comment, and forward.

The content recommendation methods provided in the embodiments of this application may be applied to a terminal on which a target application is installed, where the target application is an application with an information pushing function, and the terminal may be a smartphone, a tablet computer, a personal computer, a portable computer, or the like. For example, the target application is a game, a social application, an instant messaging application, a video playback application, or the like. This is not limited in this embodiment of this application.

The following describes the content recommendation method provided in the embodiments of this application with reference to several exemplary application scenarios.

I. Article Recommendation Scenario

In a read application, the content recommendation method provided in the embodiments of this application may be implemented as a content pushing module in the application. The application performs, according to a daily reading habit of a user, feature extraction on a time length of tapping to read an article and a behavior such as like, comment, or forward, to obtain a user feature of the user. In some embodiments, the application may further acquire related identity information reported by the user when registering. For example, the identity information may include gender, age, education background, resident city, and the like.

II. Video Pushing Scenario

In the video pushing scenario, the content recommendation method provided in the embodiments of this application may be implemented as a content pushing module in an application. A video application determines a degree of interest of a user in a video according to viewed content and a viewing duration of the user. In some embodiments, the application determines the degree of interest of the user in the video according to a ratio of a time length of viewing the video by the user to a full length of the video. For example, if the time length of viewing by the user is 100% of the full length of the video, it is considered that the user is interested in the video. If the time length of viewing by the user is less than 50% of the full length of the video, it is considered that the user is not interested in the video.

Certainly, the foregoing uses only a few possible application scenarios as examples for description. The method provided in the embodiments of this application may be further applied to another application scenario that requires content recommendation. A specific application scenario is not limited in the embodiments of this application.

Figure 15:
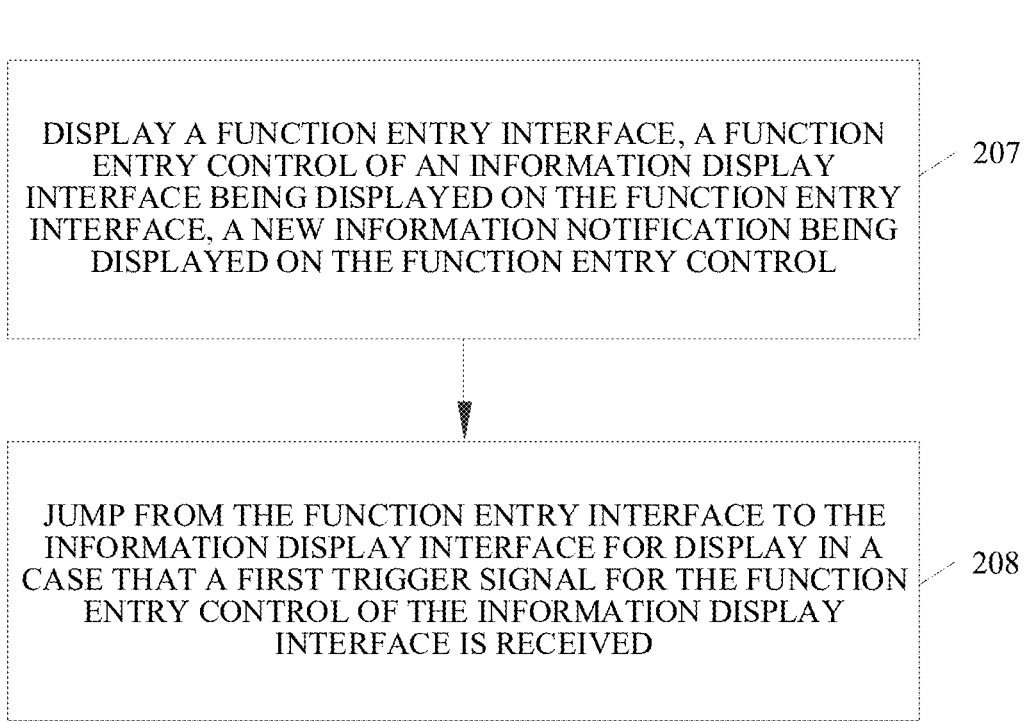
FIG. 15 is a display flowchart of a content recommendation function according to an exemplary embodiment of this application.

In a specific example, the foregoing method may be applied to the instant messaging application "WeChat" launched by Tencent. WeChat is the most popular instant messaging application in China, and has more than 1.4 billion users. As shown in FIG. 15, the users' using method includes the following steps.

Step 207. A first terminal displays a function entry interface, a function entry control of an information display interface being displayed on the function entry interface, a new information notification being displayed on the function entry control.

Because an application may have a plurality of application functions, the first terminal may first display a function entry interface of the application in an initial state, and a function entry control of an information display interface is displayed on the function entry interface.

In some embodiments, a function entry control of another function interface is further displayed on the function entry interface.

Figure 16:
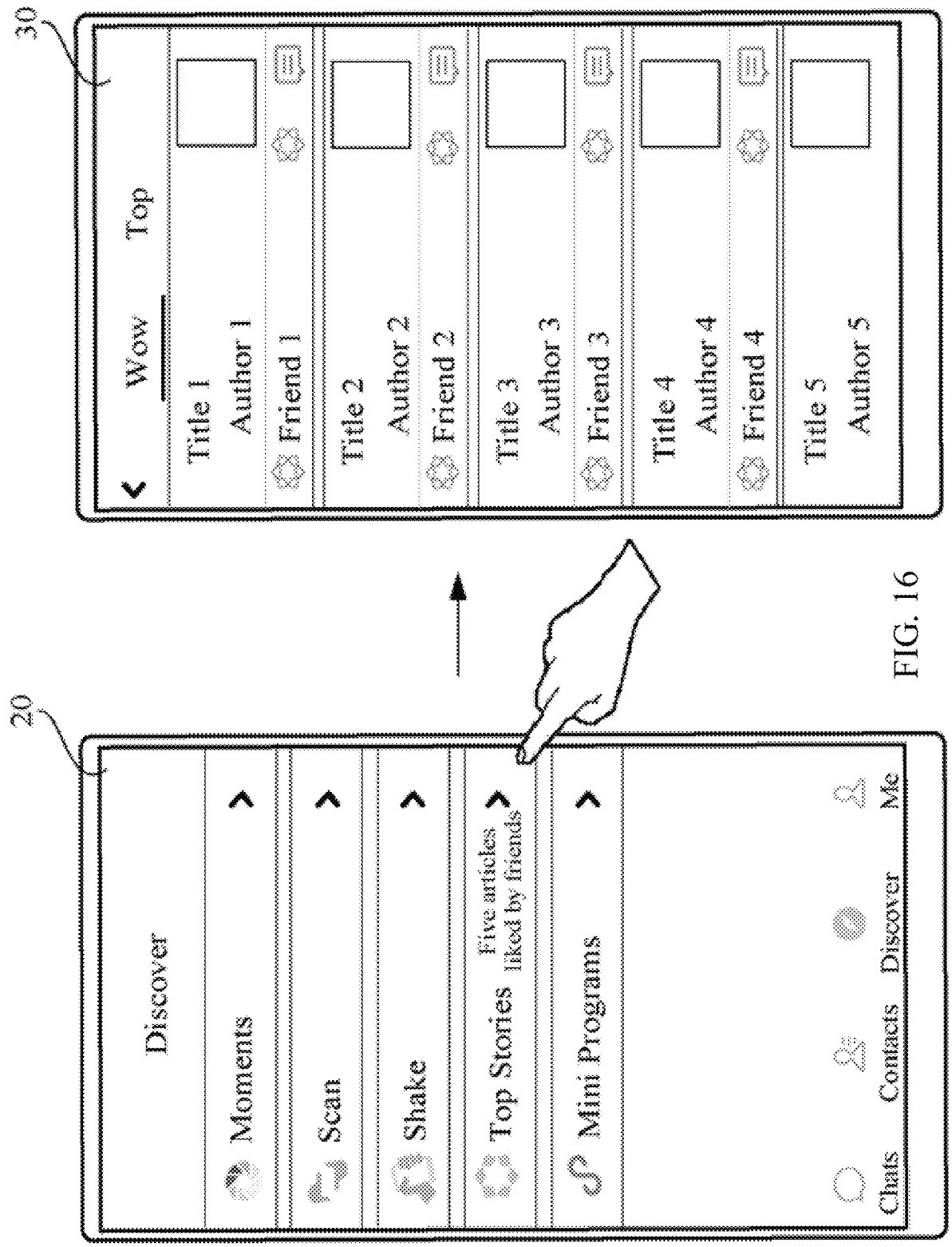
FIG. 16 is an interface diagram of content recommendation according to another exemplary embodiment of this application.

For example, as shown in FIG. 16, the application is an instant messaging application, and a function entry "Moments", a function entry "Scan", a function entry "Shake", a function entry "Top Stories", and a function entry "Mini Programs" are displayed on a function entry interface 20 of the instant messaging application.

The function entry "Top Stories" is a function entry control of an information display interface.

Step 208. The first terminal jumps from the function entry interface to the information display interface for display in a case that a first trigger signal for the function entry control of the information display interface is received.

After the function entry control of the information display interface "Top Stories" is tapped/clicked, a jump is made from the function entry interface 20 to an information display interface 30 for display.

For example, as shown in FIG. 16, the information display interface 30 includes a tab "Wow" and a tab "Top".

The tab "Wow" is configured for displaying the foregoing information recommended based on the RALM, and the tab "Top" is configured for displaying information recommended based on another recommendation algorithm.

When the information display interface 30 is just opened, interactive recommended information in the tab "Wow" may be displayed by default.

In another example, the information display interface includes: a first tab and a second tab. Any one of the first tab and the second tab may be configured for displaying interactive recommended information. For example, the second tab is configured for displaying interested information, and the first tab is configured for displaying long-tail information and hotspot news information. In some embodiments, the first terminal first jumps from the function entry interface to the first tab of the information display interface for display, a label of the second tab being further displayed on the first tab. In a case that a trigger signal corresponding to the label of the second tab is received, the first terminal switches from the first tab to the second tab in the information display interface for display.

Deep learning models such as deep neural networks (DNNs) and recurrent neural networks (RNNs) are becoming increasingly popular in recommendation. These deep learning-based methods effectively provide user preferences, project features, and a nonlinear relationship between users and projects. Compared with conventional recommendation algorithms, deep learning algorithms have better recommendation performance in most cases.

In the related art, much competitive long-tail content, including pushed new content and latest news, is often difficult to reach wide and timely exposure due to lack of behavioral features necessary for a recommendation model. This is referred to as the Matthew Effect in a recommendation system in this embodiment, which causes low recommendation content quality and poor diversity. In addition to performance, improving quality and diversity of recommendation results has become a common challenge for many recommendation systems. In general, the area under curve (AUC) surrounded by a loss sum curve and a coordinate axis is a commonly used metric in ranking model evaluation. However, a competition model defines a different loss function, making it difficult to compare losses. Moreover, the AUC is related to the ratio of positive and negative samples.

In this embodiment, a metric named prec@K is introduced, which indicates that the first K results will become actual read content of a user. The equation is as follows:

$$prec@K = \frac{1}{N} \sum_i^N \frac{size\ (R_{iK} \cap S_i)}{min(K, size\ (S_i))}$$

where K represents a quantity of recommendation results, $R_{iK}$ represents the first K items in target content to be recommended to a user i, S represents content that the user has read, and N represents a quantity of users in a test set. Some users may read less than K items, resulting in irregular low prec@K. Therefore, in this embodiment, the minimum value of K and $S_i$ is selected. In this experiment, AUC and prec@K in different models are compared in this embodiment, where $K \in \{10, 50\}$. Comparison results are shown in Table 1.

TABLE 1

| Model | AUC | prec@10 | prec@50 |
|---|---|---|---|
| Logistic regression model | 0.5252 | 0.0811 | 0.0729 |
| Yahoo look-alike model | 0.5512 | 0.1023 | 0.0941 |
| YouTube DNN | 0.5903 | 0.1217 | 0.1087 |
| RALM with a mean pooling layer | 0.5842 | 0.1108 | 0.0980 |
| RALM | 0.6012 | 0.1295 | 0.1099 |

In this embodiment, it can be seen that performance of the logistic regression model is poor, and advantages of the deep models are verified. In addition, this is also due to a lack of capability of acquiring cluster information. The look-alike model provided by Yahoo performs better than the logistic regression model, but poorer than the deep models. This is due to a large quantity of content and use of a non-iterative feature selection as a filter. The YouTube DNN achieves an absolute gain of 0.0391 over the Yahoo look-alike model, which proves the effectiveness of the deep model. The RALM with a mean pooling layer achieves an absolute AUC gain of 0.033 over the Yahoo look-alike model, but is weaker than the YouTube DNN. This means that simply averaging user embedding vectors is not as effective as an end-to-end deep model. The RALM with an attention unit performs best in all models, and it achieves an absolute gain of 0.0109 and a gain of 0.0078/0.0022 prec@10/prec@50 over the YouTube DNN. This improvement proves that an attention mechanism helps to extract information about a seed user and discover a local relationship between the seed user and a target user.

Figure 17:
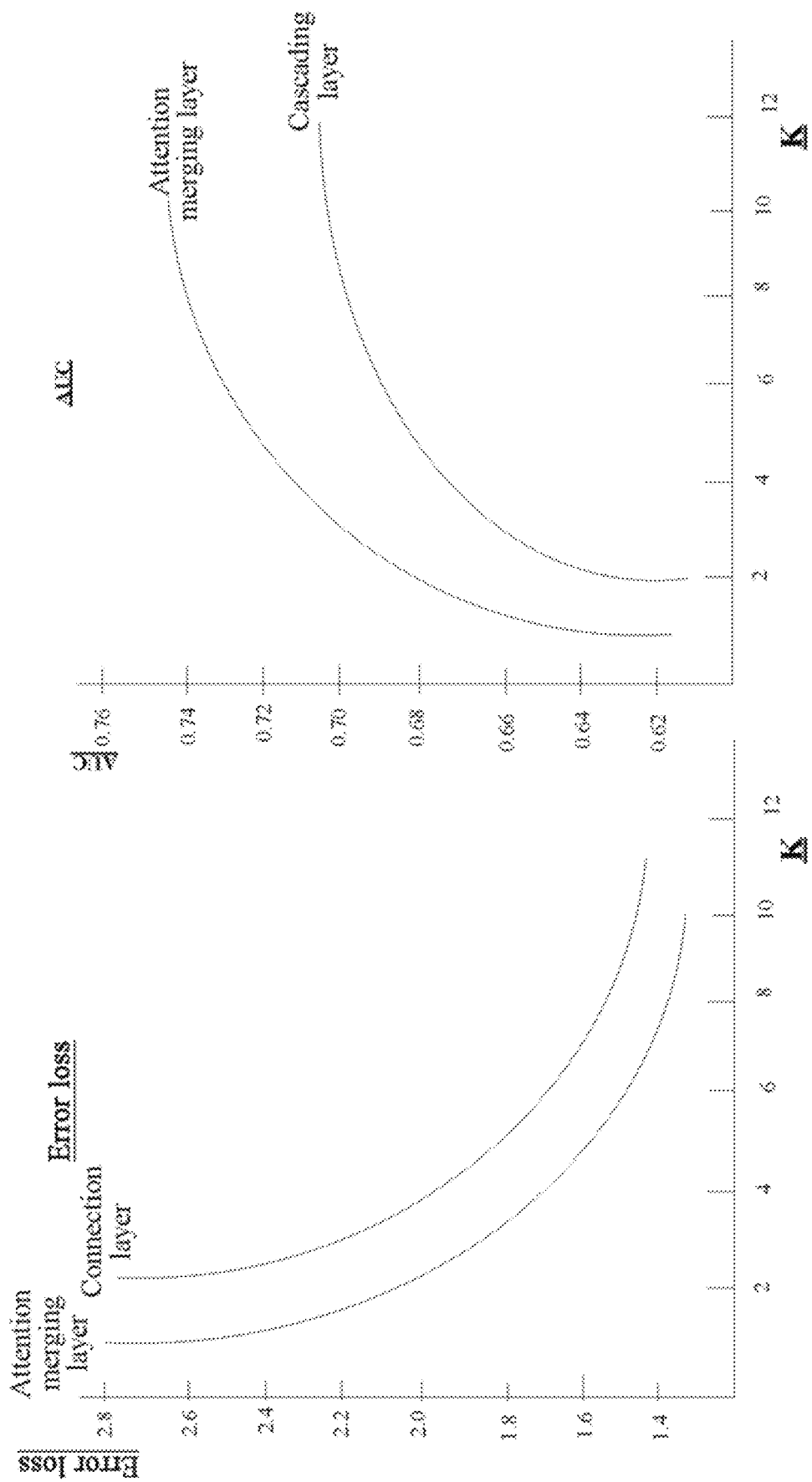
FIG. 17 is a performance comparison diagram according to an exemplary embodiment of this application.

As shown in FIG. 17, performance of an attention merging layer in AUC is better than that of a cascading layer, and a loss in a test set is much better. This is due to the design of an attention unit. When domains are connected together and transmitted forward, the same part of neurons is activated to all users. When the attention merging layer is involved, different neurons will be activated for different users. This means learning personalized interactions between features, which is helpful for a model. In look-alike learning, a cluster quantity k is a key parameter in K-means clustering.

An experiment is performed in this embodiment to observe impact of value on performance. In this experiment, k is set to 5, 10, 20, 50, and 100, with each metric undergoing five rounds of training from the test set on average.

Figure 18:
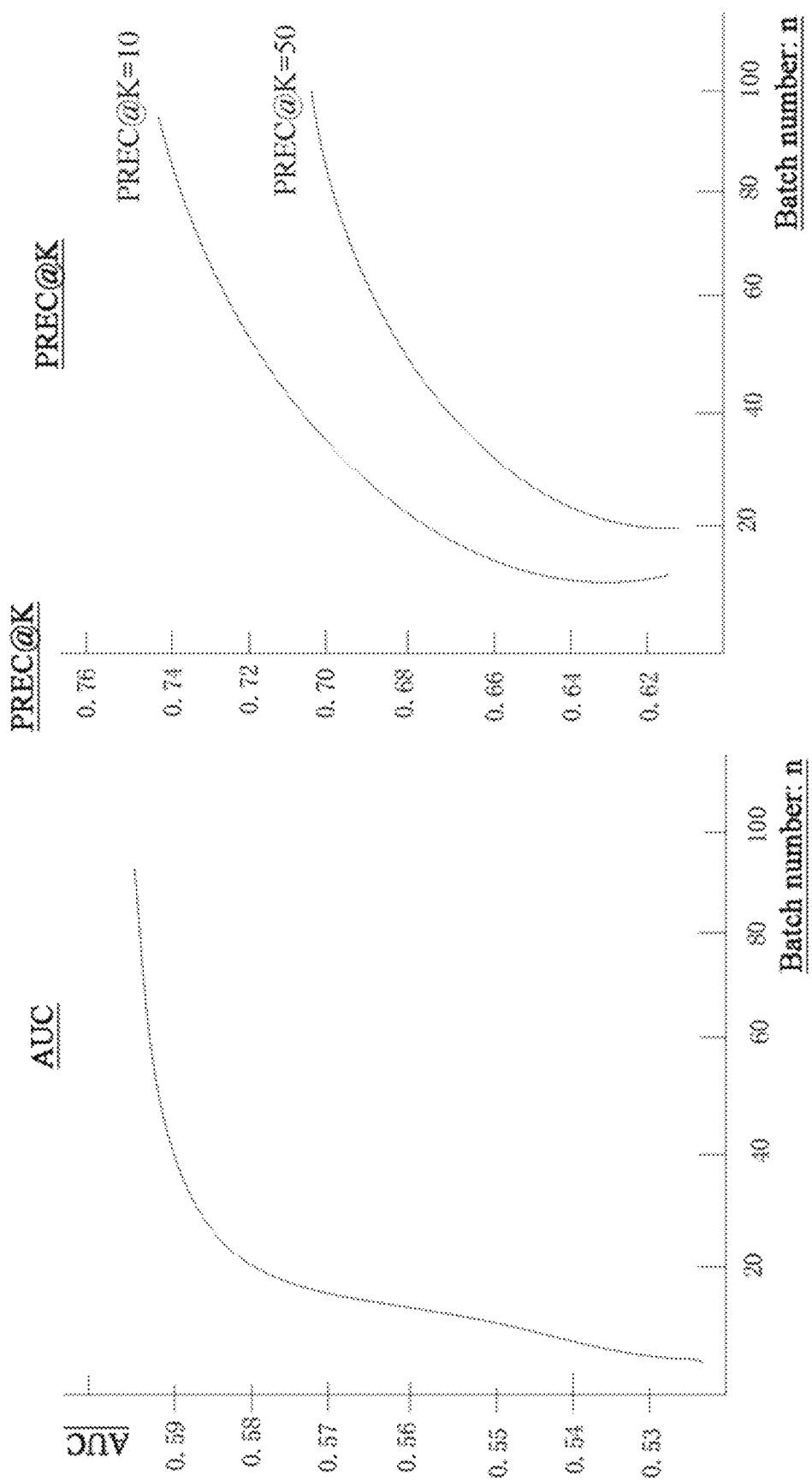
FIG. 18 is a performance comparison diagram according to another exemplary embodiment of this application.

With reference to FIG. 18, K represents a quantity of recommendation results. From a performance comparison diagram of RALM with different k values, it can be seen that after k=20, AUC and prec@K are stable. As k increases, the performance of the model is improved. The results show that the more clusters, the less seed loss information. In addition, a larger k means a larger calculation amount. In FIG. 18, a bend point in a curve may be seen in this embodiment, where a metric value after k=20 hardly increases, and therefore, K in an online model of this embodiment is set to 20.

To verify benefits from RALM to the recommendation system in this embodiment, an A/B online test is performed in an experimental environment in this embodiment. In this embodiment, online traffic is divided by user. ID and arrangement ratios of a control group and an experimental group are the same. For online performance evaluation, the following indexes are involved:

Exposure: It means that a user reads an entry, which is calculated only once. As audiences expand in a look-alike mode, more users need to be reached for a given project, and an exposure amount is expected to increase.

Click-through rate (CTR): As audiences increase, many new users share the same interest as seed users. Therefore, the CTR is not expected to decrease.

Diversity of category labels: One of the objectives of this embodiment is to enrich interests of a user in the system of this embodiment. Therefore, this embodiment defines a metric called diversity. It is represented by content that a user reads in a day, categories, or a quantity of labels. As the user is represented more comprehensively, there will be more and more candidate content types, and diversity of categories and labels will also increase.

Gini coefficient: RALM is intended to mitigate the Matthew Effect, so that this embodiment uses the Gini coefficient to measure click-through distribution of all candidate content in the recommendation system. A relatively high Gini coefficient indicates that the system consumes a relatively large amount of long-tail materials and has a relatively good distribution capability.

TABLE 2

| Project | Change |
| --- | --- |
| Exposure | +9.112% |
| Click-through rate | +1.09% |
| Diversity of categories | +8.435% |
| Diversity of labels | +15.938% |
| Gini coefficient | +5.36% |

It can be seen from Table 2 that the exposure rate is greatly increased due to an expansion of audiences. At the same time, the click-through rate also slightly increases, which indicates that expanded users are very interested in the content. In addition, the attention merging layer is applied to the user representation to discover more hidden factors that affect the user's interests. As such, audiences may be expanded by using interests in more aspects, and the diversity of categories and labels also significantly increases. In general, RALM provides a high quality and diversified expansion for seeds. All recommendation content may reach appropriate target users. Accordingly, the Gini coefficient reaches a gain of 5.36%.

The following describes apparatus embodiments of this application. For details not described in detail in the apparatus embodiments, reference may be made to the foregoing corresponding method embodiments.

Figure 19:
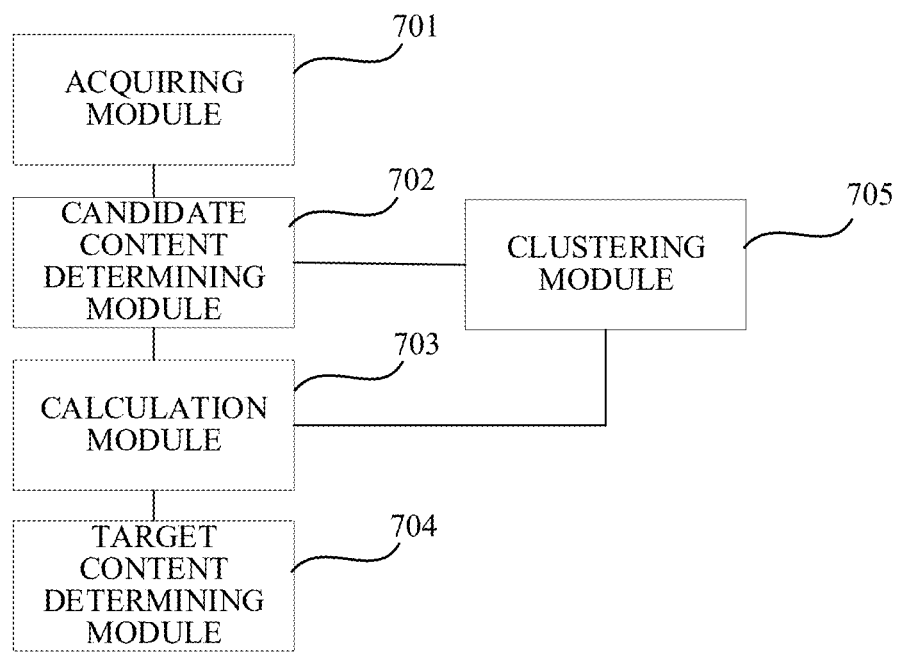
FIG. 19 is a block diagram of a content recommendation apparatus according to an exemplary embodiment of this application.

FIG. 19 shows a block diagram of a content recommendation apparatus according to an exemplary embodiment of this application. The apparatus may be implemented by using a processor, a memory, and a program in the memory. The apparatus includes:

an acquiring module 701, configured to acquire a target user vector of a target user;

a candidate content determining module 702, configured to determine n groups of seed user vectors according to the target user vector, the n groups of seed user vectors being corresponding to n pieces of candidate recommendation content, and n being a positive integer;

a calculation module 703, configured to invoke a look-alike model to calculate a similarity between the target user vector and each group of seed user vectors, the look-alike model being used for calculating a similarity score between user vectors based on an attention mechanism; and a target content determining module 704, configured to determine, among the n pieces of candidate recommendation content, target content to be recommended to the target user according to the respective similarities of the corresponding n groups of seed user vectors.

In some embodiments, the look-alike model includes a first full connection layer, a second full connection layer, and an attention unit. The calculation module 703 is configured to:

invoke the first full connection layer to perform feature extraction on the group of seed user vectors to obtain seed look-alike vectors; and invoke the second full connection layer to perform feature extraction on the target user vector to obtain a target look-alike vector;

invoke the attention unit to calculate a seed weight vector according to the seed look-alike vectors and the target look-alike vector; and calculate a vector distance between the seed weight vector and the target look-alike vector, and determine the vector distance as the similarity.

In some embodiments, the attention unit includes a local attention unit and a global attention unit. The calculation module 703 is configured to:

invoke the local attention unit to calculate a local attention vector according to the target look-alike vector and the seed look-alike vectors;

invoke the global attention unit to calculate a global attention vector according to the seed look-alike vectors; and perform weighting calculation on the local attention vector and the global attention vector to obtain the seed weight vector.

In some embodiments, the determining module 702 is configured to:

determine the n pieces of candidate recommendation content of the target user; and determine, for each of the n pieces of candidate recommendation content, a group of seed user vectors corresponding to the candidate recommendation content.

In some embodiments, the determining module 702 is configured to:

determine, for each of the n pieces of candidate recommendation content, user vectors of L users who have generated an interaction behavior with the candidate recommendation content, as a group of seed user vectors corresponding to the candidate recommendation content.

In some embodiments, the determining module 702 is configured to:

determine, for each of the n pieces of candidate recommendation content, user vectors of L users who have generated an interaction behavior with the candidate recommendation content within a preset time period, as a group of seed user vectors corresponding to the candidate recommendation content.

In some embodiments, the content recommendation apparatus in this embodiment of this application further includes a clustering module 705.

The clustering module 705 is configured to cluster, for an $i^{th}$ group of seed user vectors in the n groups of seed user vectors, L seed user vectors in the $i^{th}$ group of seed user vectors into K seed user vectors, K being less than L, and i being less than or equal to n.

In some embodiments, the clustering module 705 is configured to:

cluster the L seed user vectors into K sets by using a target clustering algorithm; and average, for each set in the K sets, at least one seed user vector in the set to obtain a seed user vector corresponding to the set; or determine, for each set in the K sets, a seed user vector that is in the set and located at a cluster centroid as a seed user vector corresponding to the set.

In some embodiments, the acquiring module 701 is configured to:

invoke an embedded layer in a user vector extraction model to perform feature extraction on a user feature of the target user in at least one domain to obtain a feature vector corresponding to each domain, the domain being a logical range divided according to a feature attribute;

invoke a merging layer in the user vector extraction model to calculate a domain weight of each domain, and perform weighted fusion on the feature vector corresponding to each domain based on the domain weight of each domain, to obtain a weighted fusion vector, the merging layer being a neural network layer based on the attention mechanism; and invoke a full connection layer in the user vector extraction model to perform feature extraction on the weighted fusion vector to obtain the target user vector of the target user.

Figure 20:
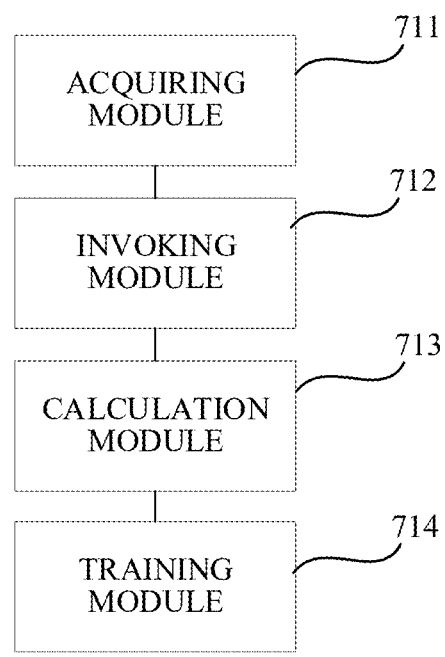
FIG. 20 is a block diagram of a content recommendation apparatus according to another exemplary embodiment of this application.

FIG. 20 shows a block diagram of a training apparatus for a look-alike model according to an exemplary embodiment of this application. The apparatus may be implemented by using a processor, a memory, and a program in the memory. The apparatus includes:

an acquiring module 711, configured to acquire second training samples, the second training samples including a sample user vector and seed user vectors corresponding to sample content;

an invoking module 712, configured to invoke a first full connection layer to perform feature extraction on the seed user vectors to obtain seed look-alike vectors; and invoke a second full connection layer to perform feature extraction on the sample user vector to obtain a sample look-alike vector, the invoking module 712 being further configured to invoke an attention unit to calculate a seed weight vector according to the seed look-alike vectors and the sample look-alike vector;

a calculation module 713, configured to calculate a vector distance between the seed weight vector and the sample look-alike vector; and a training module 714, configured to calculate a second error loss according to the vector distance, and train the look-alike model according to the second error loss by using a back propagation algorithm.

Figure 21:
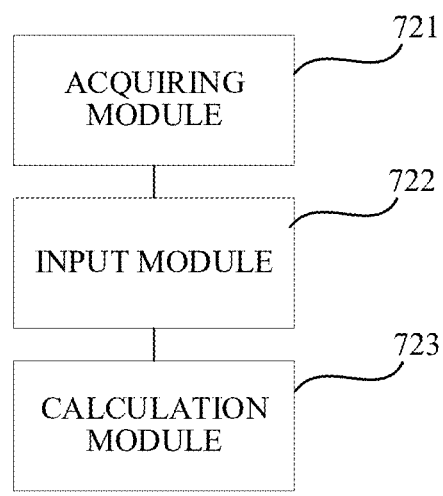
FIG. 21 is a block diagram of a content recommendation apparatus according to another exemplary embodiment of this application.

FIG. 21 shows a training apparatus for a user vector extraction model according to an exemplary embodiment of this application. The apparatus includes:

an acquiring module 721, configured to acquire first training samples, the first training samples including user features of a plurality of sample users and interaction records of the plurality of sample users for sample content;

an input module 722, configured to input a user feature of a first sample user into the user vector extraction model to obtain a first user vector, the first sample user being any one of the plurality of sample users in the first training samples;

a calculation module 723, configured to calculate a dot product of the first user vector and an embedding vector of the sample content, the calculation module 723 being further configured to calculate a first error loss according to the dot product and an interaction record of the first sample user for the sample content; and the calculation module 723 being further configured to train the user vector extraction model according to the first error loss by using a back propagation algorithm.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

An embodiment of this application further provides a non-transitory computer-readable storage medium, storing at least one instruction, at least one program, a code set, or an instruction set, the at least one instruction, the at least one program, the code set, or the instruction set being loaded and executed by a processor, to implement the foregoing content recommendation method, the training method for a user vector extraction model, or the training method for a look-alike model.

An embodiment of this application further provides a computer program product, storing at least one instruction, at least one program, a code set, or an instruction set, the at least one instruction, the at least one program, the code set, or the instruction set being loaded and executed by a processor to implement the foregoing content recommendation method, the training method for a user vector extraction model, or the training method for a look-alike model.

Figure 22:
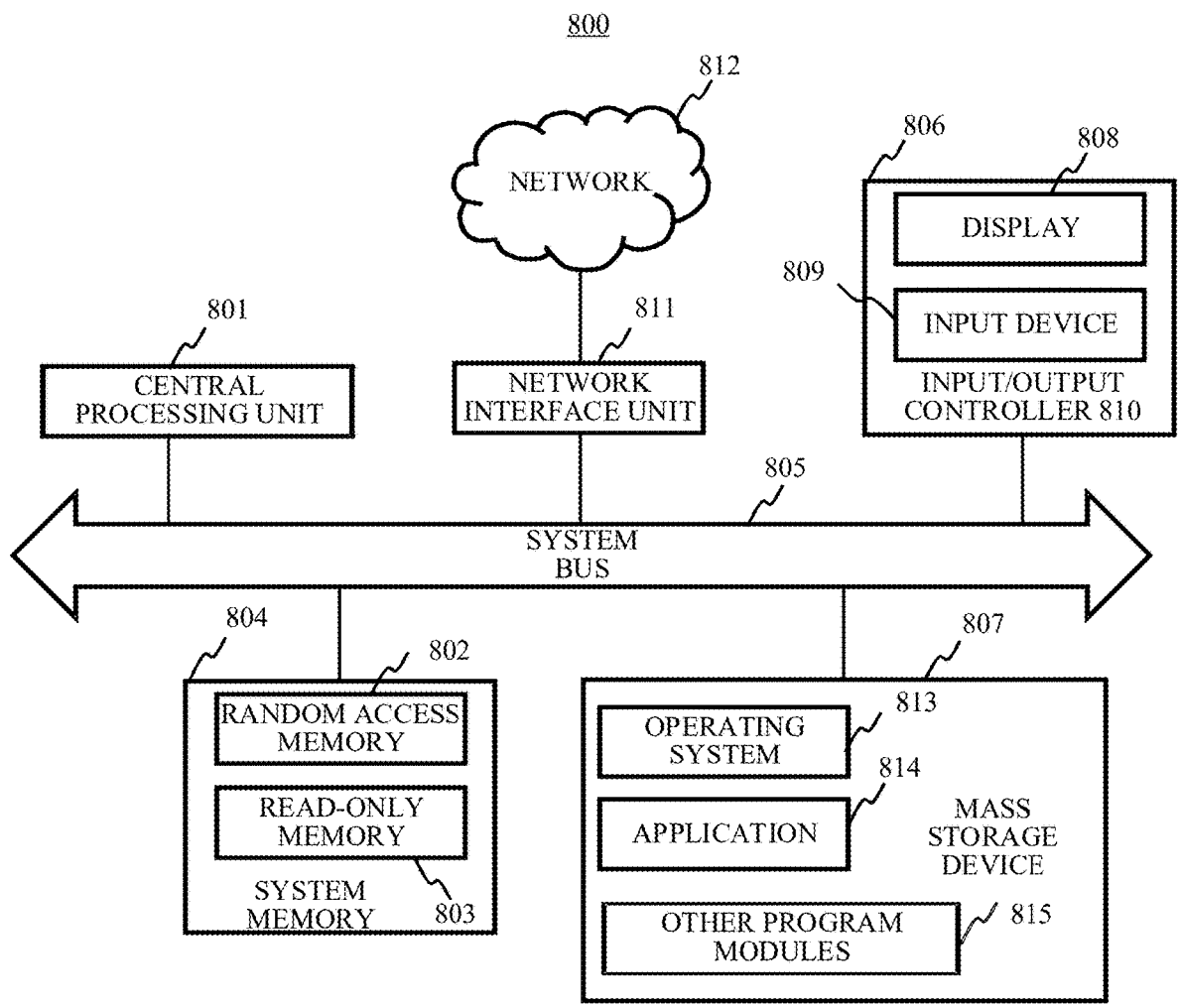
FIG. 22 is a structural block diagram of a server according to an embodiment of this application.

FIG. 22 is a schematic structural diagram of a server provided in an embodiment of this application. The server is configured to implement the content recommendation method, the training method for a user vector extraction model, or the training method for a look-alike model that are provided in the foregoing embodiments. Specifically:

A server 800 includes a central processing unit (CPU) 801, a system memory 804 including a random access memory (RAM) 802 and a read-only memory (ROM) 803, and a system bus 805 connecting the system memory 804 and the CPU 801. The server 800 further includes a basic input/output system (I/O system) 806 assisting in transmitting information between devices in a computer, and a mass storage device 807 configured to store an operation system 813, an application 814 and another program module 815.

The basic I/O system 806 includes a display 808 configured to display information and an input device 809 such as a mouse or a keyboard that is used for inputting information by a user. The display 808 and the input device 809 are both connected to the CPU 801 by using an input/output controller 810 connected to the system bus 805. The basic I/O system 806 may further include the input and output controller 810 to be configured to receive and process inputs from a plurality of other devices such as a keyboard, a mouse, and an electronic stylus. Similarly, the input/output controller 810 further provides an output to a display screen, a printer, or another type of output device.

The mass storage device 807 is connected to the CPU 801 by using a mass storage controller (not shown) connected to the system bus 805. The mass storage device 807 and a computer-readable medium associated with the mass storage device provide non-volatile storage for the server 800. That is, the mass storage device 807 may include the computer-readable medium (not shown) such as a hard disk or a CD-ROM driver.

Generally, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer-storage medium includes a RAM, a ROM, an erasable programmable ROM (EPROM), an electrically erasable programmable ROM (EEPROM), a flash memory or another solid-state storage technology, a CD-ROM, a DVD or another optical storage, a magnetic cassette, a magnetic tape, or a magnetic disk storage or another magnetic storage device. Certainly, a person skilled in art can know that the computer storage medium is not limited to the foregoing several types. The system memory 804 and the mass storage device 807 may be collectively referred to as a memory.

According to various embodiments of this application, the server 800 may further be connected, by using a network such as the Internet, to a remote computer on the network and run. That is, the server 800 may be connected to a network 812 by using a network interface unit 811 that is connected to the system bus 805, or may be connected to a network of another type or a remote computer system (not shown) by using the network interface unit 811.

After considering the specification and practicing the present disclosure, a person skilled in the art may easily conceive of other implementations of this application. This application is intended to cover any variations, uses, or adaptive changes of this application. These variations, uses, or adaptive changes follow the general principles of this application and include common general knowledge or common technical means in the art, which are not disclosed in this application. This specification and the embodiments are considered as merely exemplary, and the scope and spirit of this application are pointed out in the following claims.

It is to be understood that this application is not limited to the precise structures described above and shown in the accompanying drawings, and various modifications and changes can be made without departing from the scope of this application. The scope of this application is subject only to the appended claims.

"Plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely preferred embodiments of this application, and are not intended to limit this application. Any modification, equivalent replacement, improvement and the like made within the spirit and principle of this application shall fall within the protection scope of this application.

What is claimed is:

1. A content recommendation method performed by a computer device, the method comprising:
    acquiring a target user vector of a target user;
    determining n groups of seed user vectors, each of the n groups of seed user vectors indicating characteristics of a respective piece of n pieces of candidate recommendation content, and n being a positive integer;
    for each piece of n pieces of candidate recommendation content and a corresponding group of seed user vectors from the n groups of seed user vectors:
        invoking a local attention unit to calculate a local attention vector based on the corresponding group of seed user vectors;
        invoking a global attention unit to calculate a global attention vector based on the corresponding group of seed user vectors;
        generating a seed weight vector by applying a first weight to the local attention vector and a second weight to the global attention vector; and
        calculating a similarity between the target user vector and the seed weight vector;
    determining, among the n pieces of candidate recommendation content, target content to be recommended to the target user based on the calculated similarities of the n pieces of candidate recommendation content;
    causing, based on determining the target content, modification of a display characteristic of a function entry control in a function entry interface at a user device of the target user;
    receiving a user input via the function entry control; and
    causing, at the user device and based on the user input, display of an information display interface comprising the target content.

2. The method according to claim 1, further comprising:
    for each piece of n pieces of candidate recommendation content and a corresponding group of seed user vectors from the n groups of seed user vectors:
        invoking a first full connection layer to perform feature extraction on the corresponding group of seed user vectors to obtain seed look-alike vectors; and
        invoking a second full connection layer to perform feature extraction on the target user vector to obtain a target look-alike vector.

3. The method according to claim 2, wherein, for each piece of n pieces of candidate recommendation content and a corresponding group of seed user vectors from the n groups of seed user vectors:

the invoking the local attention unit to calculate the local attention vector is further based on the target look-alike vector and the seed look-alike vectors;

the invoking the global attention unit to calculate the global attention vector is further based on the seed look-alike vectors; and the calculating the similarity comprises calculating a vector distance between the seed weight vector and the target look-alike vector.

4. The method according to claim 2, wherein the local attention unit and the global attention unit are trained by:

acquiring second training samples, the second training samples comprising a sample user vector and seed user vectors corresponding to sample content;

invoking the first full connection layer to perform feature extraction on the seed user vectors to obtain seed look-alike vectors;

invoking the second full connection layer to perform feature extraction on the sample user vector to obtain a sample look-alike vector;

invoking the local attention unit and the global attention unit to calculate a second seed weight vector according to the seed look-alike vectors and the sample look-alike vector;

calculating a vector distance between the seed weight vector and the sample look-alike vector; and calculating a second error loss according to the vector distance, and training the local attention unit and the global attention unit according to the second error loss by using a back propagation algorithm.

5. The method according to claim 1, wherein the determining n groups of seed user vectors according to the target user vector comprises:

determining the n pieces of candidate recommendation content associated with the target user; and determining, for each of the n pieces of candidate recommendation content, a group of seed user vectors corresponding to the candidate recommendation content.

6. The method according to claim 5, wherein the determining, for each of the n pieces of candidate recommendation content, the group of seed user vectors corresponding to the candidate recommendation content comprises:

determining, for each of the n pieces of candidate recommendation content, user vectors of L users who have generated an interaction behavior with the candidate recommendation content within a preset time period, as a group of seed user vectors corresponding to the candidate recommendation content.

7. The method according to claim 1, further comprising:
clustering, for an $i^{th}$ group of seed user vectors among the n groups of seed user vectors, L seed user vectors in the $i^{th}$ group of seed user vectors into K seed user vectors, K being less than L, and i being less than or equal to n.

8. The method according to claim 7, wherein the clustering the L seed user vectors in the $i^{th}$ group of seed user vectors into K seed user vectors comprises:

clustering the L seed user vectors into K sets by using a target clustering algorithm; and determining, for each set in the K sets, a seed user vector that is in the set and located at a cluster centroid as a seed user vector corresponding to the set.

9. The method according to claim 1, wherein the acquiring the target user vector of the target user comprises:

invoking an embedding layer in a user vector extraction model to perform feature extraction on a user feature of the target user in at least one domain to obtain a feature vector corresponding to each domain, the domain being a logical range divided according to a feature attribute;

invoking a merging layer in the user vector extraction model to calculate a domain weight of each domain, and performing weighted fusion on the feature vector corresponding to each domain based on the domain weight of each domain, to obtain a weighted fusion vector, the merging layer being a neural network layer based on an attention mechanism; and invoking a full connection layer in the user vector extraction model to perform feature extraction on the weighted fusion vector to obtain the target user vector of the target user.

10. A computer device, comprising a processor and a memory, the memory storing a plurality of computer programs, the computer programs, when executed by the processor, causing the computer device to perform a plurality of operations including:

acquiring a target user vector of a target user;

determining n groups of seed user vectors, each of the n groups of seed user vectors indicating characteristics of a respective piece of n pieces of candidate recommendation content, and n being a positive integer;

for each piece of n pieces of candidate recommendation content and a corresponding group of seed user vectors from the n groups of seed user vectors:

invoking a local attention unit to calculate a local attention vector based on the corresponding group of seed user vectors;

invoking a global attention unit to calculate a global attention vector based on the corresponding group of seed user vectors;

generating a seed weight vector by applying a first weight to the local attention vector and a second weight to the global attention vector; and calculating a similarity between the target user vector and the seed weight vector;

determining, among the n pieces of candidate recommendation content, target content to be recommended to the target user based on the calculated similarities of the n pieces of candidate recommendation content;

causing, based on the target content, modification of a display characteristic of a function entry control in a function entry interface at a user device of the target user;

receiving a user input via the function entry control; and
causing, at the user device and based on the user input, display of an information display interface comprising the target content.

11. The computer device according to claim 10, wherein the computer programs, when executed by the processor, causing the computer device to perform:

for each piece of n pieces of candidate recommendation content and a corresponding group of seed user vectors from the n groups of seed user vectors:

invoking a first full connection layer to perform feature extraction on the corresponding group of seed user vectors to obtain seed look-alike vectors; and invoking a second full connection layer to perform feature extraction on the target user vector to obtain a target look-alike vector.

12. The computer device according to claim 11, wherein, for each piece of n pieces of candidate recommendation content and a corresponding group of seed user vectors from the n groups of seed user vectors:

the invoking the local attention unit to calculate the local attention vector is further based on the target look-alike vector and the seed look-alike vectors;

the invoking the global attention unit to calculate the global attention vector is further based on the seed look-alike vectors; and the calculating the similarity comprises calculating a vector distance between the seed weight vector and the target look-alike vector.

13. The computer device according to claim 11, wherein the local attention unit and the global attention unit are trained by:

acquiring second training samples, the second training samples comprising a sample user vector and seed user vectors corresponding to sample content;

invoking the first full connection layer to perform feature extraction on the seed user vectors to obtain seed look-alike vectors; and invoking the second full connection layer to perform feature extraction on the sample user vector to obtain a sample look-alike vector;

invoking the local attention unit and the global attention unit to calculate a second seed weight vector according to the seed look-alike vectors and the sample look-alike vector;

calculating a vector distance between the seed weight vector and the sample look-alike vector; and calculating a second error loss according to the vector distance, and training the look-alike model according to the second error loss by using a back propagation algorithm.

14. The computer device according to claim 10, wherein the determining n groups of seed user vectors according to the target user vector comprises:

determining the n pieces of candidate recommendation content associated with the target user; and determining, for each of the n pieces of candidate recommendation content, a group of seed user vectors corresponding to the candidate recommendation content.

15. The computer device according to claim 14, wherein the determining, for each of the n pieces of candidate recommendation content, the group of seed user vectors corresponding to the candidate recommendation content comprises:

determining, for each of the n pieces of candidate recommendation content, user vectors of L users who have generated an interaction behavior with the candidate recommendation content within a preset time period, as a group of seed user vectors corresponding to the candidate recommendation content.

16. The computer device according to claim 10, wherein the plurality of operations further comprise:

clustering, for an $i^{th}$ group of seed user vectors among the n groups of seed user vectors, L seed user vectors in the $i^{th}$ group of seed user vectors into K seed user vectors, K being less than L, and i being less than or equal to n.

17. The computer device according to claim 16, wherein the clustering the L seed user vectors in the ith group of seed user vectors into K seed user vectors comprises:

clustering the L seed user vectors into K sets by using a target clustering algorithm; and determining, for each set in the K sets, a seed user vector that is in the set and located at a cluster centroid as a seed user vector corresponding to the set.

18. The computer device according to claim 10, wherein the acquiring the target user vector of the target user comprises:

invoking an embedding layer in a user vector extraction model to perform feature extraction on a user feature of the target user in at least one domain to obtain a feature vector corresponding to each domain, the domain being a logical range divided according to a feature attribute;

invoking a merging layer in the user vector extraction model to calculate a domain weight of each domain, and performing weighted fusion on the feature vector corresponding to each domain based on the domain weight of each domain, to obtain a weighted fusion vector, the merging layer being a neural network layer based on an attention mechanism; and invoking a full connection layer in the user vector extraction model to perform feature extraction on the weighted fusion vector to obtain the target user vector of the target user.

19. A non-transitory computer-readable storage medium storing computer readable instructions that, when executed by a processor, cause a data processing system to perform:

acquiring a target user vector of a target user;

determining n groups of seed user vectors, each of the n groups of seed user vectors indicating characteristics of a respective piece of n pieces of candidate recommendation content, and n being a positive integer;

for each piece of n pieces of candidate recommendation content and a corresponding group of seed user vectors from the n groups of seed user vectors:

invoking a local attention unit to calculate a local attention vector based on the corresponding group of seed user vectors;

invoking a global attention unit to calculate a global attention vector based on the corresponding group of seed user vectors;

generating a seed weight vector by applying a first weight to the local attention vector and a second weight to the global attention vector; and calculating a similarity between the target user vector and the seed weight vector;

determining, among the n pieces of candidate recommendation content, target content to be recommended to the target user based on the calculated similarities of the n pieces of candidate recommendation content;

causing, based on determining the target content, modification of a display characteristic of a function entry control in a function entry interface at a user device of the target user;

receiving a user input via the function entry control; and causing, at the user device and based on the user input, display of an information display interface comprising the target content.

20. The non-transitory computer-readable storage medium according to claim 19, wherein the computer readable instructions, when executed by the processor, cause the data processing system to perform:

for each piece of n pieces of candidate recommendation content and a corresponding group of seed user vectors from the n groups of seed user vectors:

invoking a first full connection layer to perform feature extraction on the corresponding group of seed user vectors to obtain seed look-alike vectors; and invoking a second full connection layer to perform feature extraction on the target user vector to obtain a target look-alike vector.

* * * * *